United States Patent
Cui et al.

(10) Patent No.: US 11,405,118 B2
(45) Date of Patent: *Aug. 2, 2022

(54) ELECTRONIC DEVICE IN WIRELESS COMMUNICATION SYSTEM AND WIRELESS COMMUNICATION METHOD WITH MULTIPLE CHANNEL ACCESS DETERMINATION

(71) Applicant: Sony Corporation, Tokyo (JP)

(72) Inventors: Qimei Cui, Beijing (CN); Haowei Wang, Beijing (CN); Xiaofeng Tao, Beijing (CN); Bingshan Hu, Beijing (CN)

(73) Assignee: SONY CORPORATION, Tokyo (JP)

(*) Notice: Subject to any disclaimer, the term of this patent is extended or adjusted under 35 U.S.C. 154(b) by 87 days.

This patent is subject to a terminal disclaimer.

(21) Appl. No.: 16/889,812

(22) Filed: Jun. 2, 2020

(65) Prior Publication Data
US 2020/0336229 A1    Oct. 22, 2020

Related U.S. Application Data

(63) Continuation of application No. 16/075,246, filed as application No. PCT/CN2017/072838 on Feb. 3, 2017, now Pat. No. 10,727,962.

(30) Foreign Application Priority Data

Feb. 5, 2016    (CN) .......................... 201610082970.X

(51) Int. Cl.
*H04B 17/382*    (2015.01)
*H04W 74/08*    (2009.01)
(Continued)

(52) U.S. Cl.
CPC .......... *H04B 17/382* (2015.01); *H04B 17/391* (2015.01); *H04W 72/1284* (2013.01); *H04W 74/08* (2013.01)

(58) Field of Classification Search
CPC ... H04B 17/382; H04B 17/391; H04W 74/08; H04W 72/1284; H04W 74/0816; H04W 74/0808
See application file for complete search history.

(56) References Cited

U.S. PATENT DOCUMENTS 10,362,602 B2 * 7/2019 Yang .................... H04W 16/14
10,462,819 B2 * 10/2019 Bhorkar .................. H04L 5/00
(Continued)

FOREIGN PATENT DOCUMENTS

CN    104333873    2/2015
CN    104333902    2/2015
(Continued)

OTHER PUBLICATIONS

English translation of International Search Report dated Apr. 28, 2017 in PCT/CN2017/072838.

*Primary Examiner* — Hoang-Chuong Q Vu
(74) *Attorney, Agent, or Firm* — Xsensus LLP

(57) ABSTRACT

Disclosed are an electronic device in a wireless communication system, and a wireless communication method. The wireless communication system comprises multiple unlicensed carriers. The electronic device comprises: one or more processing circuits configured to: configure each of a plurality of unlicensed carriers to be a primary channel or a secondary channel, so as to obtain at least two primary channels and at least one secondary channel; perform a first channel detection process over each of the primary channels to detect whether each of the primary channels is idle, and perform a second channel detection process over each of the secondary channels to detect whether each of the secondary (Continued)

channels is idle; and perform downlink data transmission over the primary channel determined to be idle by means of the channel detection or over the primary and secondary channels determined to be idle by means of the channel detection. By utilizing the electronic device and the wireless communication method, the probability of access to an unlicensed carrier is improved.

4 Claims, 15 Drawing Sheets

(51) Int. Cl.
   *H04B 17/391* (2015.01)
   *H04W 72/12* (2009.01)

(56) References Cited

U.S. PATENT DOCUMENTS

| | | | |
|---|---|---|---|
| 2010/0097951 A1* | 4/2010 | Espina Perez | H04L 67/125 370/252 |
| 2011/0002283 A1 | 1/2011 | Drugge et al. | |
| 2012/0224612 A1 | 9/2012 | Kim et al. | |
| 2014/0098776 A1 | 4/2014 | Lim et al. | |
| 2014/0112273 A1 | 4/2014 | Aboul-Magd et al. | |
| 2014/0328235 A1 | 11/2014 | Merlin et al. | |
| 2014/0355534 A1 | 12/2014 | Vermani et al. | |
| 2015/0131641 A1 | 5/2015 | Ong et al. | |
| 2015/0215950 A1 | 7/2015 | Amini et al. | |
| 2015/0373741 A1* | 12/2015 | Yerramalli | H04W 24/08 370/336 |
| 2016/0014725 A1 | 1/2016 | Yu et al. | |
| 2016/0021667 A1 | 1/2016 | Kwon et al. | |
| 2016/0066349 A1* | 3/2016 | Seok | H04W 74/0808 370/338 |
| 2016/0135224 A1* | 5/2016 | Lee | H04L 27/2607 370/338 |
| 2016/0142192 A1* | 5/2016 | Damnjanovic | H04W 74/0816 370/329 |
| 2016/0278118 A1* | 9/2016 | Yerramalli | H04L 5/0094 |
| 2017/0332264 A1* | 11/2017 | Mo | H04W 72/085 |
| 2018/0027589 A1* | 1/2018 | Yang | H04L 25/00 370/329 |
| 2018/0255576 A1* | 9/2018 | Bhorkar | H04W 74/0808 |
| 2018/0270834 A1* | 9/2018 | Falconetti | H04W 72/082 |

FOREIGN PATENT DOCUMENTS

| | | |
|---|---|---|
| CN | 104363657 | 2/2015 |
| CN | 104469914 | 3/2015 |
| CN | 104486013 | 4/2015 |
| CN | 105072690 | 11/2015 |
| WO | 2016082292 | 6/2016 |
| WO | 2016095397 | 6/2016 |

\* cited by examiner

ELECTRONIC DEVICE IN WIRELESS COMMUNICATION SYSTEM AND WIRELESS COMMUNICATION METHOD WITH MULTIPLE CHANNEL ACCESS DETERMINATION

CROSS-REFERENCE TO RELATED APPLICATIONS

The present application is a continuation of U.S. application Ser. No. 16/075,246, filed Aug. 3, 2018, which is based on PCT filing PCT/CN2017/072838, filed Feb. 3, 2017, which claims the priority to CN 201610082970.X, filed on Feb. 5, 2016, each of which is incorporated herein by reference in its entirety.

FIELD

The present disclosure relates to the technical field of wireless communication, and in particular to an electronic device in a wireless communication system and a method for performing wireless communication in the wireless communication system.

BACKGROUND

This section provides background information relating to the present disclosure, which is not necessarily prior art.

With development and evolution of a wireless network, increasing services are carried by the wireless network. Therefore, extra spectrum resources are needed to support transmission of a great amount of data. Based on the existing long term evolution (LTE) network, a cellular wireless network operator starts to discuss how to use unauthorized spectrum resources, such as industrial scientific medical (ISM) frequency band of 5 GHz. The present disclosure relates to licensed assisted access (LAA) communication in the wireless communication network.

Channel detection can reduce interference and waste of frequency band use. The channel detection may be implemented by listen before talk (LBT). In the LBT, it is checked whether the channel is idle by clear channel assessment (CCA) before a channel or a carrier is used. In a case that a channel is idle, the channel may be accessed; and in a case that a channel is occupied, the channel cannot be accessed. Carrier aggregation is an important technology in the LTE system, and in the carrier aggregation, it is allowed to perform data transmission by a sending terminal on multiple adjacent or non-adjacent carriers. A utilization of a channel can be greatly improved by applying the carrier aggregation technology to the LAA system. In study on 3rd generation partnership project (3GPP) presently, no plausible solution is proposed for multi-carrier channel detection in the LAA system.

A solution for implementing multi-carrier channel detection in an LAA system is provided according to the present disclosure, including an uplink multi-carrier channel detection scheme and a downlink multi-carrier channel detection scheme, thereby improving a probability of accessing unauthorized carriers.

SUMMARY

This section provides a general summary of the present disclosure, and is not a comprehensive disclosure of its full scope or all of its features.

An object of the present disclosure is to provide an electronic device in a wireless communication system and a method for performing wireless communication in a wireless communication system, such that a probability of accessing to an unauthorized carrier can be increased when the electronic device in the wireless communication system performs a multi-carrier channel detection process.

According to an aspect of the present disclosure, an electronic device in a wireless communication system is provided. The wireless communication system includes multiple unauthorized carriers. The electronic device includes: one or more processing circuits configured to perform operations of: configuring each of the multiple unauthorized carriers as a primary channel or a secondary channel to obtain at least two primary channels and at least one secondary channel; configuring channel detection parameters for the at least two primary channels and the at least secondary channel; performing a first channel detection process on each of the primary channels to detect whether each of the primary channels is idle, and performing a second channel detection process on the secondary channel to detect whether the secondary channel is idle, the second channel detection process being different from the first channel detection process; and performing downlink data transmission on the primary channel which is detected to be idle by the channel detection or the primary channel and the secondary channel which are detected to be idle by the channel detection.

According to another aspect of the present disclosure, an electronic device in a wireless communication system is provided. The wireless communication system includes multiple unauthorized carriers. The electronic device includes: one or more processing circuits configured to perform operations of: acquiring information on channel detection parameters from a base station; determining whether each of the multiple unauthorized carriers is a primary channel or a secondary channel to obtain at least two primary channels and at least one secondary channel; configuring channel detection parameters for the at least two primary channels and the at least one secondary channel based on the information on channel detection parameters; performing a first channel detection process on each of the primary channels to detect whether each of the primary channels is idle, and performing a second channel detection process on the secondary channel to detect whether the secondary channel is idle, the second channel detection process being different from the first channel detection process; and performing uplink data transmission on the primary channel which is detected to be idle by the channel detection or the primary channel and the secondary channel which are detected to be idle by the channel detection.

According to another aspect of the present disclosure, an electronic device in a wireless communication system is provided. The wireless communication system includes multiple unauthorized carriers. The electronic device includes: one or more processing circuits configured to perform operations of: configuring a channel detection parameter for use in a primary channel for each of at least two of the multiple unauthorized carriers; configuring a channel detection parameters for use in a secondary channel for at least one of the multiple unauthorized carriers; and transmitting the channel detection parameter for use in the primary channel and the channel detection parameter for use in the secondary channel to a user equipment, such that the user equipment performs a first channel detection process on each of the primary channels of the multiple unauthorized carriers to detect whether each of the primary channels is idle, and performs a second channel detection process on secondary channel of the multiple unauthorized carriers to detect whether the secondary channel is idle, the second channel detection process being different from the first channel detection process.

According to another aspect of the present disclosure, a method for performing wireless communication in a wireless communication system is provided. The wireless communication system includes multiple unauthorized carriers. The method includes: configuring each of the multiple unauthorized carriers as a primary channel or a secondary channel to obtain at least two primary channels and at least one secondary channel; configuring channel detection parameters for the at least two primary channels and at least one secondary channel; performing a first channel detection process on each of the primary channels to detect whether each of the primary channels is idle, and performing a second channel detection process on the secondary channel to detect whether the secondary channel is idle, the second channel detection process being different from the first channel detection process; and performing downlink data transmission on the primary channel which is detected to be idle by the channel detection or the primary channel and the secondary channel which are detected to be idle by the channel detection.

According to another aspect of the present disclosure, a method for performing wireless communication in a wireless communication system is provided. The wireless communication system includes multiple unauthorized carriers. The method includes: acquiring information on channel detection parameters from a base station; determining whether each of the multiple unauthorized carriers is a primary channel or a secondary channel to obtain at least two primary channels and at least one secondary channel; configuring channel detection parameters for the at least two primary channels and at least one secondary channel based on the information on channel detection parameters; performing a first channel detection process on each of the primary channels to detect whether each of the primary channels is idle, and performing a second channel detection process on the secondary channel to detect whether the secondary channel is idle, the second channel detection process being different from the first channel detection process; and performing uplink data transmission on the primary channel which is detected to be idle by the channel detection or the primary channel and the secondary channel which are detected to be idle by the channel detection.

According to another aspect of the present disclosure, a method for performing wireless communication in a wireless communication system is provided. The wireless communication system includes multiple unauthorized carriers. The method includes: configuring a channel detection parameter for use in a primary channel for each of at least two of the multiple unauthorized carriers; configuring a channel detection parameter for use in a secondary channel for at least one of the multiple unauthorized carriers; and transmitting the channel detection parameter for use in the primary channel and the channel detection parameter for use in the secondary channel to a user equipment, such that the user equipment performs a first channel detection process on each of primary channels of the multiple unauthorized carriers to detect whether each of the primary channels is idle, and performs a second channel detection process on secondary channel of the multiple unauthorized carriers to detect whether the secondary channel is idle, the second channel detection process being different from the first channel detection process.

With the electronic device in the wireless communication system and the method for performing wireless communication in the wireless communication system according the present disclosure, at least two primary channels and at least one secondary channel are obtained when multiple unauthorized carriers are configured, a first channel detection process is performed on the primary channel, and a second channel detection process is performed on the secondary channel. In this way, in one aspect, in a case that one primary channel is occupied, the channel detection process may be performed on other primary channels continuously, thereby increasing a probability of accessing to the unauthorized carrier; and in the other aspect, the second channel detection process is performed on the secondary channel, thereby reducing power consumption of the electronic device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1:
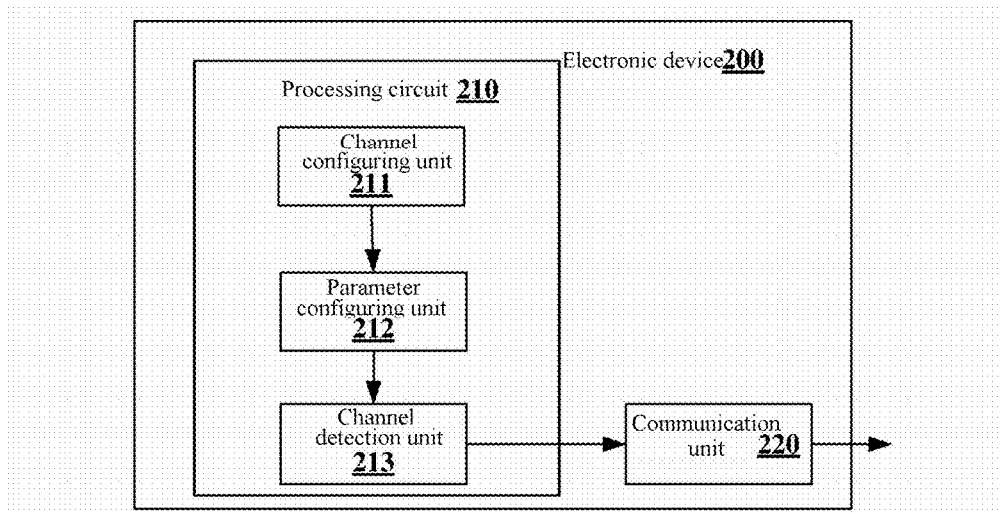
FIG. 1 is a block diagram showing a structure of an electronic device in a wireless communication system according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings. The following description is merely exemplary in nature and is not intended to limit the present disclosure, application, or uses.

Example embodiments are provided such that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A user equipment (UE) involved in the present disclosure includes but not limited to terminals with a wireless communication function such as a mobile terminal, a computer, and an on-board device. Further, depending on the described functions, the UE involved in the present disclosure may be the UE itself or a component of the UE such as a chip. In addition, similarly, a base station involved in the present disclosure may be an eNB or a component of the eNB such as a chip. Further, technical solutions according to the present disclosure may be applied to a frequency division duplexing (FDD) system and a time division duplexing (TDD) system.

Hereinafter a downlink multi-carrier channel detection scheme and an uplink multi-carrier channel detection scheme in an LAA system according to present disclosure are described respectively.

In the present disclosure, it is considered that channels correspond to carriers, that is, one carrier corresponds to one channel. In the following description, the carrier and the channel are not distinguished from each other particularly. In addition, according to an embodiment of the present disclosure, the channel detection process may be an LBT process. In some embodiments below, the multi-carrier channel detection process according to the present disclosure is described by taking the LBT process as an example. It should be noted that, in the present disclosure, the channel detection process is not limited to the LBT process and may include other types of channel detection processes. For the other types of channel detection process, the electronic device and the method according to the present disclosure are implemented similarly.

FIG. 1 shows a structure of an electronic device 200 in a wireless communication system according to an embodiment of the present disclosure. The wireless communication system includes multiple unauthorized carriers.

As shown in FIG. 1, the electronic device 200 may include a processing circuit 210. It should be noted that, the electronic device 200 may include one processing circuit 210 or multiple processing circuits 210. In addition, the electronic device 200 may further include a communication unit 220 as a transceiver and so on.

Further, the processing circuit 210 may include various discrete functional units to perform different functions and/or operations. It should be noted that, the functional units may be physical entities or logical entities, and units with different names may be implemented by a same physical entity.

For example, as shown in FIG. 1, the processing circuit 210 may include a channel configuring unit 211, a parameter configuring unit 212 and a channel detecting unit 213.

In the electronic device 200 shown in FIG. 1, the channel configuring unit 211 may configure each of multiple unauthorized carriers as a primary channel or a secondary channel, to obtain at least two primary channels and at least one secondary channel. Here, the electronic device 200 may configure each of the multiple unauthorized carriers according to a preset criterion. Further, the channel configuring unit 211 may transmit a channel configuration result to the parameter configuring unit 212.

In the embodiment, the parameter configuring unit 212 may configure channel detection parameters for the at least two primary channels and the at least one secondary channel. Specifically, the parameter configuring unit 212 may configure a channel detection parameter individually for each of the primary channels, and configure a channel detection parameter uniformly for the secondary channels. Here, the parameter configuring unit 212 may acquire the channel configuration result from the channel configuring unit 211, configure a channel detection parameter individually for each primary channel, and configure a same channel detection parameter for the secondary channels. Here, the channel detection parameters configured for the primary channels may be same or different. Further, the parameter configuring unit 212 may transmit the configured parameter to the channel detection unit 213. The channel detection parameter may include a channel detection mode. Further, the channel detection parameter may include a detection period of the channel detection, and the detection period may include a detection starting time instant and a detection ending time instant.

In the embodiment, the channel detection unit 213 may perform a first channel detection process on each of the primary channels to detect whether each of the primary channels is idle, and performs a second channel detection process on each of the secondary channels to detect whether each of the secondary channels is idle. The second channel detection process is different from the first channel detection process. Here, the channel detection unit 213 may acquire parameter configure information on each channel from the parameter configuring unit 212, and perform a channel detection process on a corresponding channel based on the channel detection parameter configured for each channel. That is, for the primary channel, the first channel detection process is performed individually on a corresponding primary channel based on the channel detection parameter configured for each primary channel. For the secondary channel, the second channel detection process is performed on the secondary channels based on the channel detection parameter uniformly configured for the secondary channels. Further, the channel detection unit 213 may determine a result of the channel detection process performed on each of the multiple unauthorized carriers, that is, detecting whether the channel is idle. Then, the channel detection unit 213 may perform downlink data transmission, based on the channel detection process result, on the primary channel detected to be idle by the channel detection or the primary channel and the secondary channel detected to be idle by the channel detection, by using the communication unit 220.

According to the embodiment of the present disclosure, at least two primary channels and at least one secondary channel are configured in the multiple unauthorized carriers, the first channel detection process is performed on the primary channel, and the second channel detection process is performed on the secondary channel. In this way, in a case that one primary channel is occupied, other primary channels may be idle, thereby increasing the probability of accessing to the unauthorized carriers. In the other aspect, the channel detection process performed on the secondary channel is different from the channel detection process performed on the primary channel, thereby reducing power consumption of the electronic device.

Figure 2:
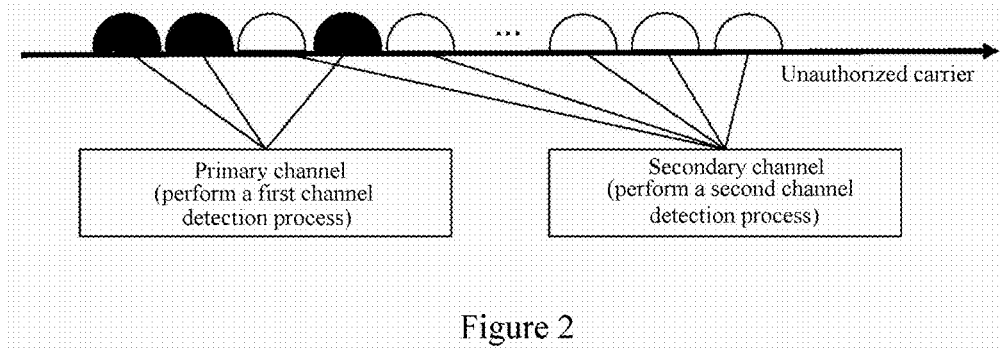
FIG. 2 is a schematic diagram of configuring a primary channel and a secondary channel according to an embodiment of the present disclosure.

FIG. 2 is a schematic diagram of configuring a primary channel and a secondary channel according to an embodiment of the present disclosure. As shown in FIG. 2, a horizontal direction indicates a frequency domain, and one semicircular pattern on the frequency domain indicates one unauthorized carrier. Although FIG. 2 shows only 8 unauthorized carriers, there are multiple unauthorized carriers not shown between the prior 5 unauthorized carriers and the posterior 3 unauthorized carriers. According to the embodiment of the present disclosure, each of the multiple unauthorized carriers may be configured as a primary channel or a secondary channel. For example, 3 primary channels and 5 secondary channels are configured in the example shown in FIG. 2. However, it should be understood by those skilled in the art that, there are other primary channels and/or secondary channels between the prior 5 unauthorized carriers and the posterior 3 unauthorized carriers, i.e., in the part not shown in FIG. 2.

According to the embodiment of the present disclosure, the wireless communication system is a licensed assisted access (LAA) system, and the electronic device 200 is a base station.

According to the embodiment of the present disclosure, the channel detection includes feature detection and energy detection. In a case of feature detection, the channel detection includes preamble detection and public land mobile network (PLMN)+primary synchronization signal (PSS)/secondary synchronization signal (SSS) detection. In a case of energy detection, the channel detection process may include: (a) energy detection excluding random backoff; (b) energy detection including random backoff and a fixed contention window size (CWS); and (c) energy detection including random backoff and a variable contention window size. In type (a), data transmission is directly performed when the energy detection indicates that the channel is idle. In the types (b) and (c), the channel detection process includes two phases. A first phase includes an initial detection period and a random backoff period, and a second phase includes a self-deferral period. It proceeds to the random backoff period after the initial detection period ends. In the random backoff period, energy detection is still performed, and backoff is performed by setting a random backoff counter (which is referred to as a counter). When the energy detection indicates that the channel is occupied, counting of the random backoff counter is interrupted, and the random backoff counter is set based on the contention window size. When the channel is detected to be idle and a time slot in which data transmission is to be performed is not coming, it proceeds to the self-deferral period to wait for the time slot in which data transmission is to be performed being coming. In the self-deferral period, energy detection is still performed; and when it is detected that a channel is occupied, the channel cannot be used to perform data transmission. That is, in the types (b) and (c), energy detection is performed at two phases of the channel detection process, i.e., the initial detection period, the random backoff period and the self-deferral period. The type (b) differs from the type (c) in that: in the type (b), the contention window size is fixed, and in the type (c), the contention window size is variable. The energy detection has a detection period. For example, in the type (b) and the type (c), the detection period includes the initial detection period, the random backoff period and the self-deferral period. When the detection period expires, it is indicated that the energy detection or the channel detection is completed.

In the embodiment of the present disclosure, the channel detection process of the type (a) does not include random backoff and include only an energy detection process for a period of time. For example, during the energy detection period, if it is sensed that the unauthorized carrier is idle, data transmission may be performed on the unauthorized carrier. The duration of the sensing process may be set according to requirements, such as greater than 25 µs. In the embodiment, it may be determined whether the unauthorized carrier is idle using any existing or known methods. For example, the energy detection is performed in the following manner. If energy detected on the unauthorized carrier during the energy detection process is less than an energy detection threshold, it is indicated that the unauthorized carrier is in an idle state.

According to the embodiment of the present disclosure, the eNB may select different channel detection processes from the several channel detection processes described above according to actual needs and content to be transmitted. Preferably, the eNB may select the first channel detection process and the second channel detection process, where the second channel detection process is simpler than the first channel detection process.

According to the embodiment of the present disclosure, the first channel detection process may be energy detection including random backoff and a variable contention window size. That is, the first channel detection process may include an initial detection period, a random backoff period and a self-deferral period, and the contention window size is variable. According to the embodiment of the present disclosure, the second channel detection process may be energy detection excluding random backoff. That is, the second channel detection process is an energy detection process for a period of time; and during the energy detection process, if it is detected that the unauthorized carrier is idle, data transmission may be performed on the unauthorized carrier.

According to the embodiment of the present disclosure, the first channel detection process may include the energy detection process for multiple times. The second channel detection process may include the energy detection process only once. As described above, the first channel detection process may include two phases, and energy detection is performed at the two phases. That is, the first channel detection process includes the energy detection process for multiple times. The second channel detection process is an energy detection process for a period of time; and during the energy detection process, if it is detected that the unauthorized carrier is idle, it is indicated that data transmission may be performed on the unauthorized carrier. That is, the second channel detection process includes the energy detection process only once.

According to the embodiment of the present disclosure, the second channel detection process is simpler than the first channel detection process, therefore power consumption of the second detection process is lower. The electronic device performs only the second channel detection process on the secondary carrier, thereby greatly reducing power consumption of the electronic device.

Figure 3:
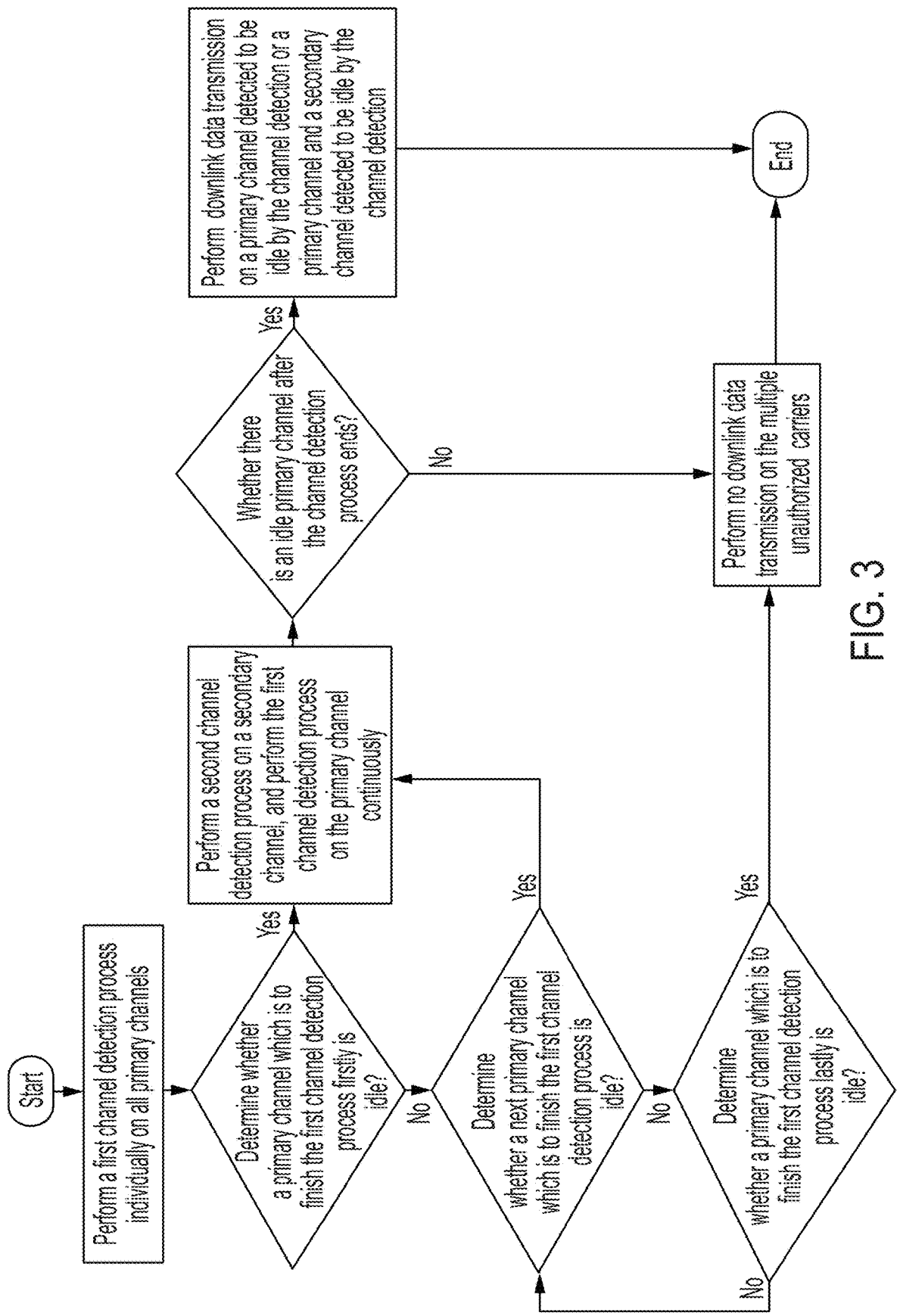
FIG. 3 is a flowchart showing a downlink multi-carrier channel detection process according to an embodiment of the present disclosure.

Hereinafter a downlink multi-carrier channel detection process according to the present disclosure is described in conjunction with FIG. 3. FIG. 3 is a flowchart showing a downlink multi-carrier channel detection process according to an embodiment of the present disclosure.

According to the embodiment of the present disclosure, when a second channel detection process is performed on each of secondary channels, the processing circuit 210 is further configured to perform an operation of: triggering each of the secondary channels to perform a second channel detection process, in a case that it is detected a primary channel which is to finish a first channel detection process firstly is idle. According to the embodiment of the present disclosure, there are one or more secondary channels. In a case that there are multiple secondary channels and it is detected that the primary channel which is to finish the first channel detection process firstly is idle, multiple secondary channels are triggered to perform the second channel detection process.

As described above, the parameter configuring unit 212 may configure a channel detection parameter individually for each of the primary channels. Here, the channel detection parameter configured individually for each of the primary channels is used to perform the first channel detection process. In other words, the first channel detection process may be performed independently on each of the primary channels based on the channel detection parameter configured for the primary channel. Further, the parameter configuring unit 212 may configure a channel detection parameter uniformly for the secondary channels. Here, the channel detection parameter configured for the secondary channel is used to perform the second channel detection process. In other words, the second channel detection processes performed on different secondary channels are not independent. Since the first channel detection process is performed individually on the primary channels, progress of the first channel detection process performed on different primary channels may be different. In addition, the first channel detection process may include an initial detection period and a random backoff period, and it is determined whether the primary channel is idle at the two periods. According to the principle in the present disclosure, when a primary channel which is to finish the first channel detection process firstly is idle, all secondary channels are triggered to perform the second channel detection process. That is, when it is detected that the first channel detection process of the primary channel is to finish and the primary channel is idle, the secondary channel starts to perform the second channel detection process.

According to the embodiment of the present disclosure, when it is detected that the primary channel which is to finish the first channel detection process firstly is idle, each of the secondary channels is triggered to perform the second channel detection process and the first channel detection process is performed continuously on the primary channel which is to finish the first channel detection process firstly.

As described above, the first channel detection process may include a first phase and a second phase. The first phase includes an initial detection period and a random backoff period, and the second phase includes a self-deferral period. When the secondary channel performs the second channel detection process, the first channel detection process may be performed continuously on the primary channel which is to finish the first channel detection process firstly. Here, the performing the first channel detection process continuously may include: the primary channel enters the self-deferral period, or the primary channel is in the self-deferral period continuously.

According to the embodiment of the present disclosure, when it is detected that the primary channel which is to finish the first channel detection process firstly is idle, each of the secondary channels is triggered to perform the second channel detection process, and the first channel detection process is performed continuously on the primary channel which is to finish the first channel detection process firstly. Meanwhile, the first channel detection process is performed independently on each of remaining primary channels. According to the embodiment of the present disclosure, the first channel detection processes performed on all primary channels are independent from each other. Therefore, progress and a result of the first channel detection process performed on one primary channel do not influence the first channel detection process performed on other primary channels.

According to the embodiment of the present disclosure, the processing circuit 210 is configured to perform an operation of: stopping performing the second channel detection process on each of the secondary channels, in a case that the primary channel which is to finish the first channel detection process firstly is occupied.

As described above, when it is detected that the primary channel which is to finish the first channel detection process firstly is idle, each of the secondary channels is triggered to perform the second channel detection process and the first channel detection process is performed continuously on the primary channel which is to finish the first channel detection process firstly. If the primary channel is detected to be occupied during the process of continuously performing the first channel detection process, the second channel detection process is stopped on each of the secondary channels to wait for a primary channel which is to finish the first channel detection process secondly and is idle.

According to the embodiment of the present disclosure, the processing circuit 210 is further configured to perform an operation of: triggering each of the secondary channels to perform the second channel detection process, in a case that the primary channel which is to finish the first channel detection process firstly is occupied and the primary channel which is to finish the first channel detection process secondly is idle.

In the embodiment, if the primary channel which is to finish the first channel detection process secondly and is idle is found, each of the secondary channels is triggered again to perform the second channel detection process.

According to the embodiment of the present disclosure, when it is detected that the primary channel which is to finish the first channel detection process secondly is idle, each of the secondary channels is triggered to perform the second channel detection process, and the first channel detection process is performed continuously on the primary channel which is to finish the first channel detection process secondly. The process is similar to the first channel detection process performed continuously on the primary channel which is to finish the first channel detection process firstly described above.

According to the embodiment of the present disclosure, when it is detected that the primary channel which is to finish the first channel detection process secondly is idle, each of the secondary channels is triggered to perform the second channel detection process and the first channel detection process is performed continuously on the primary channel which is to finish the first channel detection process secondly. Meanwhile, the first channel detection process is still performed independently on each of remaining primary channels. It should be noted that, the remaining primary channels refer to all primary channels other than the primary channel which is to finish the first channel detection process secondly, and include the primary channel which is to finish the first channel detection process firstly. That is, although it is detected that the primary channel which is to finish the first channel detection process firstly is occupied, the first channel detection process is performed continuously on the primary channel which is to finish the first channel detection process firstly. This is because the first channel detection process may include the initial detection period, the random backoff period and the self-deferral period, and energy detection is performed on all periods, thereby ensuring the channel detection process can be performed continuously regardless of detecting that the channel is occupied at which period.

According to the embodiment of the present disclosure, the processing circuit 210 is further configured to perform operations of: if the primary channel which is to finish the first channel detection process secondly is occupied, searching for continuously a next primary channel which is to finish the first channel detection process and is idle, and triggering each of the secondary channels to perform the second channel detection process until there is no new primary channel which is to finish the first channel detection process and is idle.

In the embodiment, if the primary channel which is to finish the first channel detection process secondly is occupied and there is a primary channel which is to finish the first channel detection process thirdly and is idle, the secondary channel is triggered to perform the second channel detection process for a third time, and so on, until there is no new primary channel which is to finish the first channel detection process and is idle.

According to the embodiment of the present disclosure, the electronic device performs the second channel detection process repeatedly by adopting the same channel detection parameter as that used in performing the second channel detection process for the first time. This is because the parameter configuring unit 212 configures the channel detection parameter uniformly for all the secondary channels.

According to the embodiment of the present disclosure, the processing circuit 210 is further configured to perform an operation of: not performing downlink data transmission on the multiple unauthorized carriers in a case that the primary channel which is to finish the first channel detection process lastly is occupied.

In the embodiment, if the primary channel which is to finish the first channel detection process lastly is occupied, it is indicated that all the primary channels are occupied and the electronic device 200 cannot perform downlink data transmission by using the multiple unauthorized carriers.

According to the embodiment of the present disclosure, ending time of the channel detection processes of the primary channel and the secondary channel is aligned, and the primary channel is aligned with the secondary channel through self-deferral.

According to the embodiment of the present disclosure, take a downlink multi-carrier channel detection process for example, the eNB needs to finish the channel detection process before a downlink time slot is coming, to determine to perform downlink data transmission on which unauthorized carrier(s). That is, the detection period of the channel detection process starts from a starting time instant of the channel detection process and ends at a time instant when the downlink time slot is coming. When the downlink time slot is coming, the downlink channel detection process ends. The uplink multi-carrier channel detection process is similar. That is, when an uplink time slot is coming, the uplink channel detection process ends.

According to the embodiment of the present disclosure, at the time instant when the downlink time slot is coming, the electronic device 200 may acquire results of the first channel detection process and the second channel detection process, and perform downlink data transmission on a primary channel detected to be idle by the channel detection or a primary channel and a secondary channel detected to be idle by the channel detection. Here, the result of the channel detection process includes the channel being idle or being occupied.

In addition, as described above, when it is detected that the primary channel is occupied, the first channel detection process is performed continuously on the primary channel. The second channel detection process may be performed on the secondary channel once or for multiple times. That is, the channel detection processes of all the primary channels and secondary channels end at the time instant when the downlink time slot is coming. At the time instant when the downlink time slot is coming, the eNB can determine which primary channel(s) and secondary channel(s) are idle, and perform downlink data transmission on the idle primary channel or the idle primary channel and secondary channel. That is, downlink data transmission is performed on all channels detected to be idle by the channel detection at the same time instant, i.e., the time instant when the downlink time slot is coming.

In the flowchart shown in FIG. 3, the eNB stops performing the method shown in FIG. 3 once the downlink time slot is coming, regardless of which step the method proceeds to. Results of the first channel detection process and the second channel detection process are acquired at the time instant when the downlink time slot is coming, and the downlink data transmission is performed based on the results.

According to the embodiment of the present disclosure, if one or more of the primary channels are idle and one or more of the secondary channels are idle, the eNB may perform downlink data transmission on the idle primary channel(s) and secondary channel(s).

According to the embodiment of the present disclosure, if one or more of the primary channels are idle and all the secondary channels are occupied, the eNB may perform downlink data transmission on the idle primary channel(s).

According to the embodiment of the present disclosure, each of the primary channels is aligned with each of the secondary channels through self-deferral.

The first channel detection process may include a self-deferral period. When the primary channel is detected to be idle and the downlink time slot is coming, the primary channel enters the self-deferral period to wait for a time instant when the downlink time slot is coming. In this way, all the primary channels can be aligned with all the secondary channels at the time instant when the downlink time slot is coming.

According to the embodiment of the present disclosure, all the secondary channels may perform the second channel detection process for multiple times following the primary channel which is to finish the first channel detection process and is idle. When one primary channel is occupied, the secondary channel may perform the second channel detection process following other primary channels. As compared with the solution in the conventional technology that downlink multi-carrier channel detection is performed on only one primary channel, the probability of accessing to multiple unauthorized carriers by the electronic device 200 can be increased according to the present disclosure.

Taking the LBT process as an example, a downlink multi-carrier channel detection process according to an embodiment of the present disclosure is described in detail in conjunction with FIG. 4 to FIG. 6 hereinafter.

Figure 4:
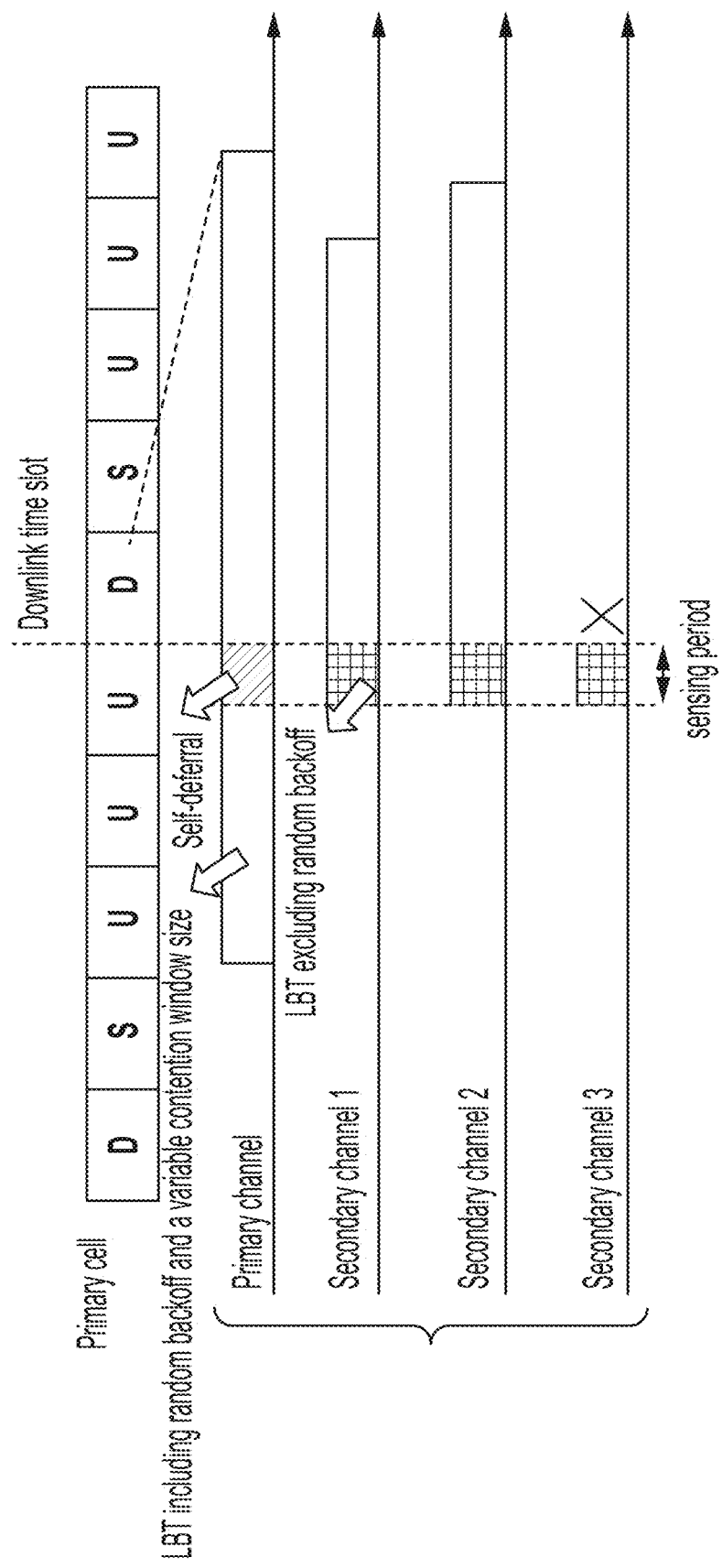
FIG. 4 is a schematic diagram showing a downlink multi-carrier LBT process according to an embodiment of the present disclosure.

FIG. 4 is a schematic diagram showing a downlink multi-carrier LBT process according to an embodiment of the present disclosure. In order to facilitate illustrating, one primary channel is shown in an example shown in FIG. 4. It should be understood that a case of multiple primary channels is similar to the case of one primary channel. In addition, in the embodiment shown in FIG. 4, the first LBT process is an LBT process including random backoff and a variable contention window size, and the second LBT process is an LBT process excluding random backoff. However, the embodiment is only schematic, and it should be understood by those skilled in the art that other LBT processes may be adopted in the present disclosure.

As shown in FIG. 4, a primary cell adopts a time slot configuration of "DSUUUDSUUU". In which, "D" indicates a downlink time slot, "S" indicates a special time slot, and "U" indicates an uplink time slot. A secondary cell transmits downlink data at a second downlink time slot, i.e., in a sixth subframe. The secondary cell needs to align with the primary cell, i.e., starting to transmit downlink data simultaneously with the primary cell. In this case, the secondary cell needs to finish the LBT process before the time instant when the downlink time slot is coming. The primary channel performs an LBT process including random backoff and a variable contention window size, i.e., including an initial detection period, a random backoff period and a self-deferral period. If the electronic device 200 detects that the primary channel is idle before the time instant when the downlink time slot is coming, the electronic device 200 performs a self-deferral process. A secondary channel 1, a secondary channel 2 and a secondary channel 3 performs an LBT process excluding random backoff, i.e., a sensing process for a period of time, when the primary channel is to finish the LBT process including random backoff and the variable contention window size. In the example shown in FIG. 4, it is assumed that the primary channel is idle, the secondary channel 1 and the secondary channel 2 are idle, and the secondary channel 3 is occupied. In this case, when the downlink time slot is coming, the electronic device 200 performs downlink data transmission on the primary channel and the secondary channel 1 and the secondary channel 2.

According to the embodiment of the present disclosure, the primary channel which is to finish the first channel detection process is a primary channel on which the electronic device 200 is to perform a self-deferral process. In the embodiment, the electronic device 200 finishes the initial detection process and the random backoff process of the first channel detection process on the primary channel, and detects that the primary channel is idle and is to perform the self-deferral process. Therefore, it can be determined that the primary channel is to finish the first channel detection process, and the secondary channel may be triggered to perform the second channel detection process in this case.

Figure 5:
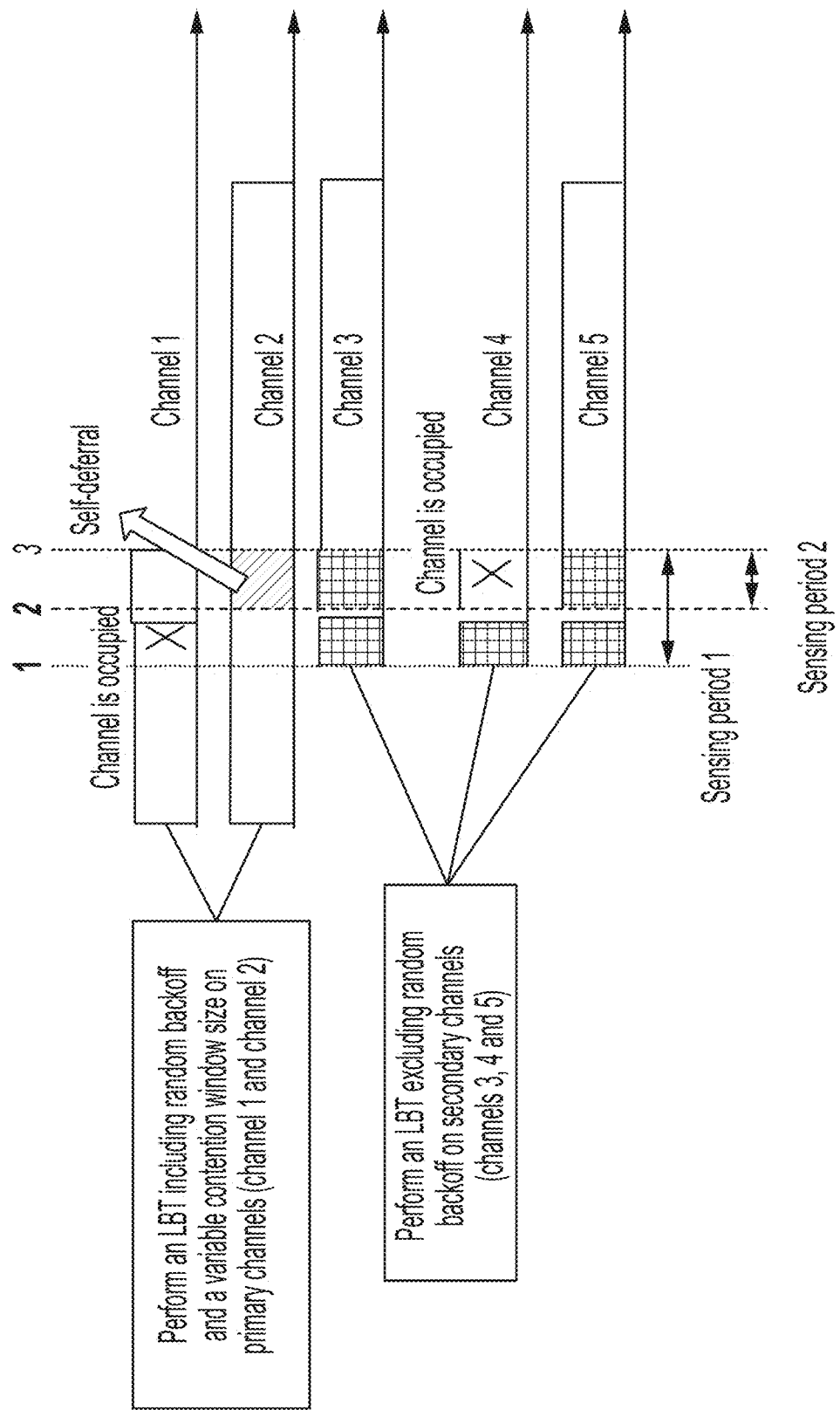
FIG. 5 is a schematic diagram showing another downlink multi-carrier LBT process according to an embodiment of the present disclosure.

FIG. 5 is a schematic diagram showing another downlink multi-carrier LBT process according to an embodiment of the present disclosure. For facilitating illustration, in an example shown in FIG. 5, 5 unauthorized carriers are shown, which includes 2 primary channels: a channel 1 and a channel 2; and 3 secondary channels: a channel 3, a channel 4 and a channel 5. It should be understood by those skilled in the art that, the wireless communication system according to the present disclosure may further include unauthorized carriers the number of which is not 5. In addition, in the embodiment shown in FIG. 5, the first LBT process is an LBT process including random backoff and a variable contention window size, and the second LBT process is an LBT process excluding random backoff. Practically, the embodiment is schematic, and it should be understood by those skilled in the art that other LBT processes may be adopted in the present disclosure.

As shown in FIG. 5, the electronic device 200 performs an LBT process including random backoff and a variable contention window size independently on the channel 1 and the channel 2. When the electronic device 200 finishes the initial detection process and the random backoff process of the LBT process on the channel 1 and detects that the channel 1 is idle, i.e., at a time instant shown by a vertical line "1", the electronic device 200 determines that the channel 1 is the first primary channel which is to finish the LBT process including random backoff and a variable contention window size and is idle. In this case, the channel 1 performs the first LBT process continuously, i.e., performing the self-deferral process, and the channel 3, the channel 4 and the channel 5 perform the LBT process excluding random backoff during a sensing period 1. If the electronic device 200 discovers that the channel 1 is occupied by other system or operator when performing the self-deferral process on the channel 1, the channel 3, the channel 4 and the channel 5 stop performing the LBT process excluding random backoff, and the electronic device 200 waits for a next primary channel which is to finish the LBT process including random backoff and the variable contention window size. When the electronic device 200 finishes the initial detection process and the random backoff process of the LBT process on the channel 2 and detects that the channel 2 is idle, at a time instant shown by a vertical line "2", the electronic device 200 determines the channel 2 is a second primary channel which is to finish the LBT process including random backoff and the variable contention window size and is idle, the channel 2 performs the self-deferral process and the channel 3, the channel 4 and the channel 5 perform the LBT process excluding random backoff during a sensing period 2. At the same time, the channel 1 performs the LBT process including random backoff and the variable contention window size continuously, until a time instant when a downlink time slot is coming. In the LBT process excluding random backoff, if it is detected that the channel 2, the channel 3 and the channel 5 are idle, and the channel 4 is occupied, the electronic device 200 may acquire a detection result that the channel 1 and the channel 4 are occupied and the channels 2, 3 and 5 are idle, at a time instant when the downlink time slot is coming, i.e., at a time instant shown by a vertical line "3". In this case, the electronic device 200 performs downlink data transmission on the primary channel 2, the secondary channel 3 and the secondary channel 5. In the example shown in FIG. 5, if there is a channel 6 which is a primary channel and is idle, the electronic device 200 may also perform downlink data transmission on the primary channel 6, in addition to the primary channel 2, the secondary channel 3 and the secondary channel 5.

According to the embodiment of the present disclosure, the electronic device 200 may configure N different sensing periods, i.e., a sensing period 1, a sensing period 2, ..., a sensing period n, ..., a sensing period N. N is the number of primary channels configured by the electronic device 200, and sizes of the sensing periods descend from the sensing period 1 to the sensing period N, $n \in [1,N]$. In the embodiment, the n-th primary channel which is to finish the first channel detection process is a primary channel which is performing the self-deferral process of the first channel detection process at the sensing period n before downlink data transmission. That is, at the sensing period 1 before downlink data transmission, the electronic device 200 determines primary channel(s) which have finished the initial detection process and the random backoff process, have detected that the primary channels are idle and are performing the self-deferral process. If there are multiple primary channels which are performing the self-deferral process, the multiple primary channels may be ranked according to a certain rule such as channel numbers, and the primary channel ranking first functions as the first primary channel which is to finish the first channel detection process. Further, if the first primary channel which is to finish the first channel detection process is occupied, the electronic device 200 determines primary channel(s) which have finished the initial detection process and the random backoff process, have detected that the primary channels are idle and are performing the self-deferral process, at the sensing period 2 before downlink data transmission. Similarly, if there are multiple primary channels which are performing the self-deferral process, the multiple primary channels are ranked according to a certain rule such as channel numbers, and the primary channel ranked first functions as a second primary channel which is to finish the first channel detection process. Similarly, in this manner, the first primary channel which is to finish the first channel detection process, the second primary channel which is to finish the first channel detection process, ..., and the last primary channel which is to finish the first channel detection process can be determined sequentially.

Figure 6:
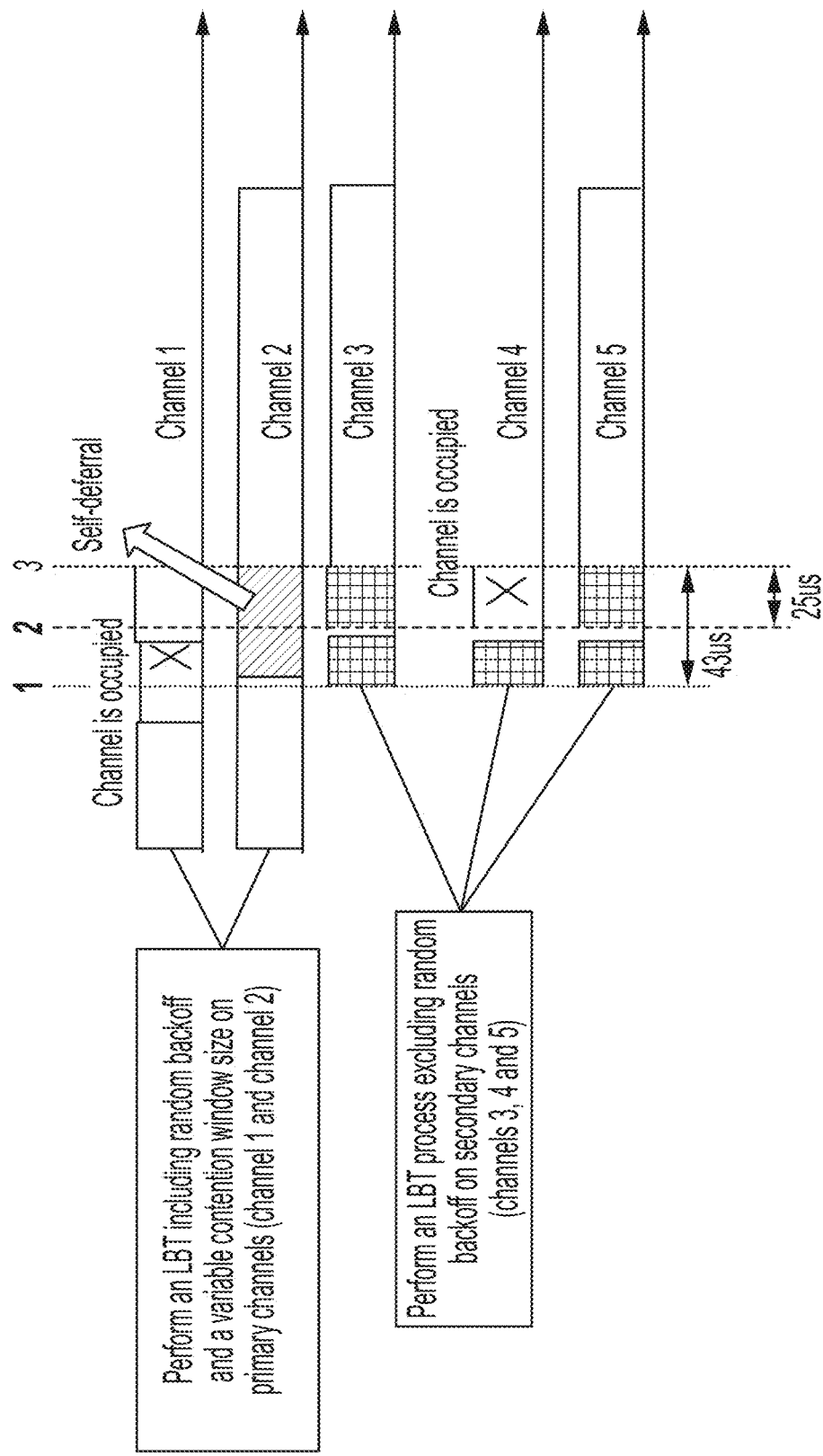
FIG. 6 is a schematic diagram showing another downlink multi-carrier LBT process according to an embodiment of the present disclosure.

FIG. 6 is a schematic diagram showing another downlink multi-carrier LBT process according to an embodiment of the present disclosure. For facilitating illustration, in an example shown in FIG. 6, 5 unauthorized carriers are shown, which includes 2 primary channels: a channel 1 and a channel 2; and 3 secondary channels: a channel 3, a channel 4 and a channel 5. It should be understood by those skilled in the art that, the wireless communication system according to the present disclosure may further include unauthorized carriers the number of which is not 5. Accordingly, in the embodiment shown in FIG. 6, two sensing periods are shown, in which, a sensing period 1 is 43 µs, and a sensing period 2 is 25 µs. In addition, in the embodiment shown in FIG. 6, the first LBT process is an LBT process including random backoff ad a variable contention window size, and the second LBT process is an LBT process excluding random backoff. Practically, the embodiment is schematic, and it should be understood by those skilled in the art that other LBT processes may be adopted in the present disclosure.

As shown in FIG. 6, the electronic device 200 performs the LBT process including random backoff and the variable contention window size on a channel 1 and a channel 2 independently. At a time instant of 43 µs before downlink data transmission, i.e., at a time instant shown by a vertical line "1" in FIG. 6, the electronic device 200 determines that the channel 1 finishes the initial detection process and the random backoff process, and detects that the channel 1 is idle and is performing the self-deferral process. Therefore, the electronic device 200 determines that the channel 1 is a first primary channel which is to finish the LBT process including random backoff and the variable contention window size and is idle, the channel 1 performs the self-deferral process continuously, and the channel 3, the channel 4 and the channel 5 perform the LBT process excluding random backoff. If the electronic device 200 discovers that the channel 1 is occupied by other system or operator when performing the self-deferral process on the channel 1, the channel 3, the channel 4 and the channel 5 stop the LBT process excluding random backoff, and the electronic device 200 waits for a next primary channel which is to finish the LBT process including random backoff and the variable contention window size and is idle. At the same time, the channel 1 performs the LBT process including random backoff and the variable contention window size continuously, until a time instant when a downlink time slot is coming. At a time instant of 25 µs before downlink data transmission, i.e., at a time instant shown by a vertical line "2" in FIG. 6, the electronic device 200 determines that the channel 2 finishes the initial detection process and the random backoff process, and detects that the channel 2 is idle and is performing the self-deferral process. Therefore, the electronic device 200 determines that the channel 2 is a secondary primary channel which is to finish the LBT process including random backoff and the variable contention window size and is idle, the channel 2 performs the self-deferral process continuously, and the channel 3, the channel 4 and the channel 5 perform the LBT process excluding random backoff. If the channel 2, the channel 3 and the channel 5 are idle and the channel 4 is occupied, the electronic device 200 may acquire a detection result that the channel 1 and the channel 4 are occupied and the channels 2, 3 and 5 are idle, at a time instant when the downlink time slot is coming, i.e., at the time instant shown by the vertical line "3". In this case, the electronic device 200 performs downlink data transmission on the primary channel 2, the secondary channel 3 and the secondary channel 5.

According to the embodiment of the present disclosure, the primary channel which is to finish the first channel detection process may be defined by other methods, which are not limited in the present disclosure.

Figure 7:
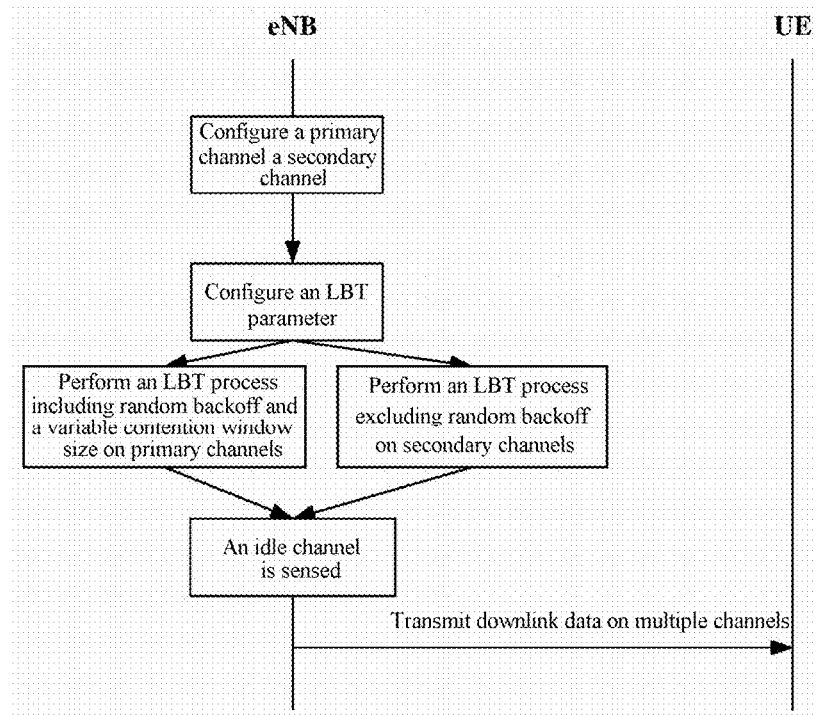
FIG. 7 is a schematic diagram showing signaling interaction in a downlink multi-carrier LBT process according to an embodiment of the present disclosure.

FIG. 7 is a schematic diagram showing signaling interaction in a downlink multi-carrier LBT process according to an embodiment of the present disclosure. As shown in FIG. 7, an eNB configures each of multiple unauthorized carriers as a primary channel or a secondary channel, to obtain at least two primary channels and at least one secondary channel. Subsequently, the eNB configures LBT parameters for the primary channels and the secondary channel. Subsequently, the eNB performs an LBT process including random backoff and a variable contention window on the primary channels, and performs an LBT process excluding random backoff on the secondary channel. Subsequently, the eNB transmits downlink data to the UE on an idle primary channel or idle primary channel(s) and secondary channel(s).

In the above embodiments, the downlink multi-carrier channel detection scheme is introduced in detail. Hereinafter an uplink multi-carrier channel detection scheme is introduced in detail.

Figure 8:
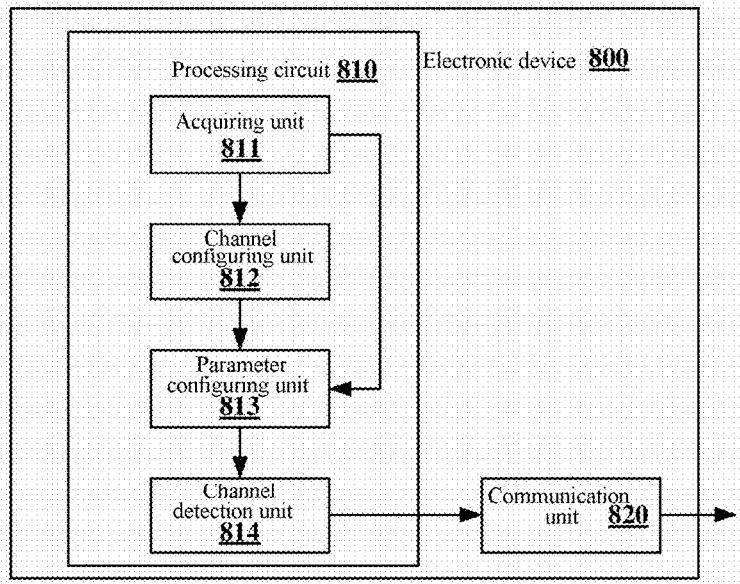
FIG. 8 is a block diagram showing a structure of another electronic device in a wireless communication system according to an embodiment of the present disclosure.

FIG. 8 is a block diagram showing a structure of another electronic device in a wireless communication system according to an embodiment of the present disclosure. The wireless communication system includes multiple unauthorized carriers. As shown in FIG. 8, the electronic device 800 may include a processing circuit 810. It should be noted that, the electronic device 800 may include one processing circuit 810 or multiple processing circuits 810. In addition, the electronic device 800 may further include a communication unit 820 such as a transceiver.

As described above, similarly, the processing circuit 810 may include various discrete functional units to perform different functions and/or operations. The functional units may be physical entities or logical entities, and units with different names may be implemented by a same physical entity.

For example, as shown in FIG. 8, the processing circuit 810 may include an acquiring unit 811, a channel configuring unit 812, a parameter configuring unit 813 and a channel detection unit 814.

The acquiring unit 811 may acquire information on a channel detection parameter from the base station. Here, the acquiring unit 811 may acquire the information on the channel detection parameter by any method well-known in the art. Further, the acquiring unit 811 may transmit the acquired information on the channel detection parameter to the channel configuring unit 812 and the parameter configuring unit 813.

Preferably, the acquiring unit 811 acquires the information on the channel detection parameter from the base station via radio resource control RRC signaling or medium access control MAC signaling.

Preferably, the information on the channel detection parameter includes information on a channel detection parameter of the primary channel and information on a channel detection parameter of the secondary channel.

The channel configuring unit 812 may determine whether each of the multiple unauthorized carriers is a primary channel or a secondary channel, to obtain at least two primary channels and at least one secondary channel. Here, the electronic device 800 may configure each of the multiple unauthorized carriers according to a preset rule. Further, the channel configuring unit 812 may transmit a result of the channel configuration to the parameter configuring unit 813.

The parameter configuring unit 813 may configure channel detection parameters for the at least two primary channels and at least one secondary channel based on information on the channel detection parameter. Preferably, the parameter configuring unit 813 configures a channel detection parameter individually for each of the primary channels, and configures a channel detection parameter uniformly for the secondary channels. Here, the parameter configuring unit 813 may acquire the information on the channel detection parameter from the acquiring unit 811, and transmit the configured channel detection parameter to the channel detection unit 814.

The channel detection unit 814 may perform a first channel detection process on each of the primary channels, and performs a second channel detection process different from the first channel detection process on each of the secondary channels. Here, the channel detection unit 814 may acquire the configured channel detection parameter from the parameter configuring unit 813 and perform the channel detection process based on the configured channel detection parameter. For example, based on the channel detection parameter configured individually for each of the primary channels, the first channel detection process is performed independently on each of the primary channels to detect whether each of the primary channels is idle. Based on the channel detection parameter configured uniformly for the secondary channels, the second channel detection process is performed on each of the secondary channels to detect whether each of the secondary channels is idle. Here, the second channel detection processes performed on all the secondary channels are not independent. Further, the channel detection unit 814 may determine a result of the channel detection process, i.e., determining whether the channel is idle or occupied. Then, the channel detection unit 814 may perform uplink data transmission on the primary channel detected to be idle by the channel detection or the primary channel and the secondary channel detected to be idle by the channel detection using the communication unit 820, based on the result of the channel detection.

According to the embodiment of the present disclosure, similar to the downlink multi-carrier channel detection scheme, in the uplink multi-carrier channel detection scheme, at least two primary channels and at least one secondary channel are configured in the multiple authorized carriers, the first channel detection process is performed on the primary channel, and the second channel detection process is performed on the secondary channel. In this way, when one primary channel is occupied, other primary channels may be idle, thereby increasing a probability of accessing to the unauthorized carrier. In another aspect, the channel detection process performed on the secondary channel differs from the channel detection process performed on the primary channel, thereby reducing power consumption of the electronic device.

According to the embodiment of the present disclosure, the wireless communication system is a licensed assisted access LAA system, and the electronic device 800 is a user equipment. In the uplink multi-carrier channel detection scheme, the electronic device 800 is to transmit uplink data to a base station, therefore the electronic device 800 needs to finish the channel detection process before a time instant when an uplink time slot is coming, to determine channels on which uplink data is to be transmitted. In the uplink multi-carrier channel detection scheme, the carrier configuration process is similar to that in the downlink multi-carrier channel detection scheme. For example, the multiple unauthorized carriers in the wireless communication system may be configured by using the method shown in FIG. 2.

In addition, according to the embodiment of the present disclosure, in the uplink multi-carrier channel detection scheme, the first channel detection process and the second channel detection process may be determined by using the method similar to that in the downlink multi-carrier channel detection scheme, which is not described in detail here. For example, the first channel detection process may be energy detection including random backoff and a variable contention window size. That is, the first channel detection process may include an initial detection period, a random backoff period and a self-deferral period, and the contention window size is variable. According to the embodiment of the present disclosure, the second channel detection process may be energy detection excluding random backoff. That is, the second channel detection process is energy detection for a period of time, and during the energy detection period, data transmission may be performed on an unauthorized carrier if the unauthorized carrier is detected to be idle.

According to the embodiment of the present disclosure, when the second channel detection process is performed on each of the secondary channels, the processing circuit 810 is further configured to perform an operation of: triggering each of the secondary channels to perform the second channel detection process, when it is detected that a primary channel which is to finish the first channel detection process firstly is idle.

According to the embodiment of the present disclosure, the processing circuit 810 is configured to perform an operation of: triggering each of the secondary channels to perform the second channel detection process, when it is detected that the primary channel which is to finish the first channel detection process firstly is occupied and a primary channel which is to finish the first channel detection process secondly is idle.

According to the embodiment of the present disclosure, the processing circuit 810 is further configured to perform an operation of: when detecting that the primary channel which is to finish the first channel detection process secondly is occupied, searching for continuously a next primary channel which is to finish the first channel detection process and is idle, and triggering each of the secondary channels to perform the second channel detection process, until there is no new primary channel which is to finish the first channel detection process and is idle.

According to the embodiment of the present disclosure, the processing circuit 810 is further configured to perform an operation of: performing no uplink data transmission on the multiple unauthorized carriers in a case that a primary channel which is to finish the first channel detection process lastly is occupied.

According to the embodiment of the present disclosure, ending time of the channel detection processes of the primary channel and the secondary channel is aligned, and the primary channel is aligned with the secondary channel through self-deferral.

According to the embodiment of the present disclosure, the primary channel which is to finish the first channel detection process indicates a primary channel on which the electronic device 800 is to perform the self-deferral process.

According to the embodiment of the present disclosure, the electronic device 800 may configure N different sensing periods, i.e., a sensing period 1, a sensing period 2, . . . , a sensing period n, . . . , a sensing period N. N is the number of primary channels configured by the electronic device 800, and sizes of the sensing periods descend from the sensing period 1 to the sensing period N, n∈[1,n]. In the embodiment, the n-th primary channel which is to finish the first channel detection process is a primary channel which is performing the self-deferral process of the first channel detection process at the sensing period n before downlink data transmission.

According to the embodiment of the present disclosure, in an uplink multi-carrier channel detection scheme, the first channel detection process and the second channel detection process may be performed by using the method similar to that in the downlink multi-carrier scheme, which is not described in detail here. For example, the first LBT process and the second LBT process may be performed by using the method shown in FIGS. 3 to 6. In this case, in the example shown in FIG. 4, the primary channel, the secondary channel 1, the secondary channel 2 and the secondary channel 3 need to finish the LBT process before a time instant when an uplink time slot is coming. In the examples shown in FIG. 5 and FIG. 6, a vertical line "3" indicates a time instant when the uplink time slot is coming.

According to the embodiment of the present disclosure, in determining whether each of the multiple unauthorized carriers is a primary channel or a secondary channel, the processing circuit 810 is further configured to perform the following operations. The acquiring unit 811 may acquire UL grant information from a base station, where the UL grant information includes information on whether each of the multiple unauthorized carriers is a primary channel or a secondary channel. The configuring unit 812 may determine whether each of the multiple unauthorized carriers is a primary channel or a secondary channel, based on the information on whether each of the multiple unauthorized carriers is a primary channel or a secondary channel in the UL grant information.

In the embodiment, the base station configures each of the multiple unauthorized carriers as a primary channel or a secondary channel, to obtain at least two primary channels and at least one secondary channel. Further, the base station may transmit the information on whether each of the multiple unauthorized carriers is a primary channel or a secondary channel to the user equipment. In the embodiment, the base station may transmit the information on whether each of the multiple unauthorized carriers is a primary channel or a secondary channel by the UL grant information.

In the art, each piece of UL grant information may indicate one or more carriers. Therefore, according to the embodiment of the present disclosure, information of one or more bits may be added in the UL grant to indicate whether each of the multiple unauthorized carriers is a primary channel or a secondary channel. For example, in a case that the bit is "1", it is indicated that a corresponding carrier is configured ad a primary channel. In a case that the bit is "0", it is indicated that a corresponding carrier is configured as a secondary channel.

According to the embodiment of the present disclosure, in a case that the UL grant information indicates one carrier, information of one bit is added in the UL grant to indicate whether the carrier is a primary channel or a secondary channel. In a case that the UL grant information indicates multiple carriers, information of multiple bits is added in the UL grant to indicate that whether each of the multiple carriers is a primary channel or a secondary channel. In which, each of the multiple bits corresponds to each of the multiple carriers. In the embodiment, the base station may transmit multiple pieces of UL grant information to the user equipment, to notify the user equipment of information on whether each of the multiple unauthorized carriers is a primary channel or a secondary channel. It follows that, information of M bits in total is to be added in the UL grant to indicate whether each of the multiple unauthorized carriers is a primary channel or a secondary channel. In which, M is the number of the unauthorized carriers.

According to the embodiment of the present disclosure, after acquiring the UL grant information from the base station, the acquiring unit 811 may transmit the information on whether each of the multiple unauthorized carriers is a primary channel or a secondary channel to the channel configuring unit 812. The channel configuring unit 812 may determine whether each of the multiple unauthorized carriers is a primary channel or a secondary channel based on the information described above.

In the embodiment, in configuring channel detection parameters for the user equipment, the base station configures a channel detection parameter individually for each of the primary channels, and configures a channel detection parameter uniformly for the secondary channels. The acquiring unit 811 in the processing circuit 810 may acquire such channel detection parameter information. Thus, the user equipment may configure a channel detection parameter individually for each of the primary channels and configure a channel detection parameter uniformly for the secondary channels based on the channel detection parameter information.

Figure 9:
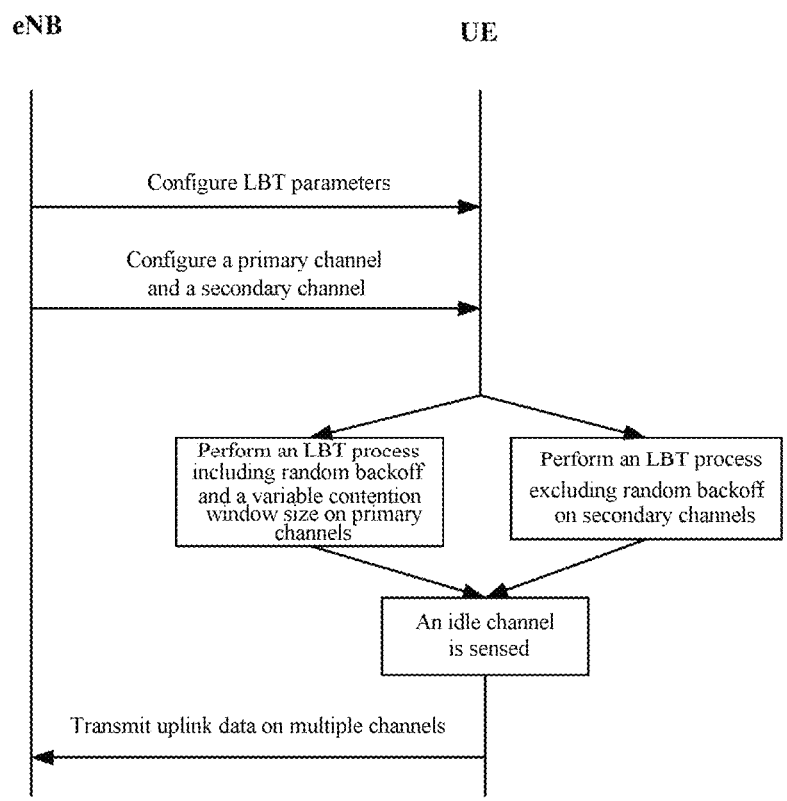
FIG. 9 is a schematic diagram showing signaling interaction in an uplink multi-carrier LBT process according to an embodiment of the present disclosure.

Hereinafter a signaling interaction process in an uplink multi-carrier channel detection process is described by taking the LBT process as an example. FIG. 9 is a schematic diagram showing signaling interaction in an uplink multi-carrier LBT process according to an embodiment of the present disclosure. As shown in FIG. 9, the eNB configures each of multiple unauthorized carriers as a primary channel or a secondary channel, and configures an LBT parameter for each of the primary channels and each of the secondary channels. Subsequently, the eNB transmits the configured LBT parameter to the UE via RRC signaling and/or medium access control MAC signaling, for example. Subsequently, the eNB transmits the configured channel information to the UE by UL grant for example. Subsequently, the UE performs energy detection including random backoff and a variable contention window size on the primary channel, and performs energy detection excluding random backoff on the secondary channel, based on the configured LBT parameter. Subsequently, if the UE senses an available unauthorized carrier, the UE transmits uplink data on the carrier(s).

According to the embodiment of the present disclosure, in determining whether each of the multiple unauthorized carriers is a primary channel or a secondary channel, the processing circuit 810 is further configured to perform the following operations. The acquiring unit 811 may pre-estimate power consumption information of the first channel detection process and the second channel detection process and power status information of the electronic device 800. The channel configuring unit 812 may determine whether each of the multiple unauthorized carriers is a primary channel or a secondary channel based on the power consumption information and the power status information.

In the embodiment, the electronic device 800 may configure each of the unauthorized carriers as a primary channel or a secondary channel by itself. For example, the electronic device 800 may pre-estimate power consumption information of the first channel detection process and the second channel detection process, and determines that the first channel detection process consumes more power than the second channel detection process. Further, the electronic device 800 may acquire power status information of the electronic device 800. In a case that the power status information of the electronic device 800 indicates that a remaining power of the electronic device 800 is great, more primary channels may be configured. In a case that the power status information of the electronic device 800 indicates that the remaining power of the electronic device 800 is small, less primary channels may be configured.

Further, in determining whether each of the multiple unauthorized carriers is a primary channel or a secondary channel, the processing circuit 810 is further configured to perform the following operations. The acquiring unit 811 may acquire a load condition on each of the multiple unauthorized carriers. The channel configuring unit 812 may determine whether each of the multiple unauthorized carriers is a primary channel or a secondary channel, based on the load condition on each of the multiple unauthorized carriers.

In the embodiment, the channel configuring unit 812 may configure a carrier with a load less than a certain threshold as a primary channel, and configure a carrier with a load greater than or equal to the threshold as a secondary channel. In this way, it can be ensured that the carrier with a light load is configured as a primary channel and a carrier with a heavy load is configured as a secondary channel, as much as possible.

In the embodiment, when the base station configures a channel detection parameter for the user equipment, the base station configures a channel detection parameter for use in the primary channel individually for each of the unauthorized carriers, and configures a channel detection parameter for use in the secondary channel uniformly for each of the unauthorized carriers. The acquiring unit 811 in the processing circuit 810 may acquire such channel detection parameter, and transmits the channel detection parameter to the parameter configuring unit 813. Thus, the parameter configuring unit 813 may configure the channel detection parameter based on information on the channel detection parameter and information on the primary channel and the secondary channel from the channel configuring unit 812. In the embodiment, in a case that a carrier is configured as a primary carrier, a channel detection parameter for use in the primary channel is configured for the carrier accordingly. In a case that a carrier is configured as a secondary carrier, a channel detection parameter for use in the secondary channel is configured for the carrier. For example, there are 5 unauthorized carriers. In configuring the channel detection parameter for the user equipment, the base station configures a channel detection parameter for use in the primary channel individually for each of 5 carriers, i.e., a channel detection parameter 1, a channel detection parameter 2, a channel detection parameter 3, a channel detection parameter 4 and a channel detection parameter 5. In addition, the base station configures a channel detection parameter for use in the secondary channel uniformly for each of 5 carriers, i.e., a channel detection parameter 6. When the user equipment determines that the carrier 1 and the carrier 2 are primary channels and the carrier 3, the carrier 4 and the carrier 5 are secondary channels, the parameter configuring unit 813 configures the channel detection parameter 1 for the carrier 1, configures the channel detection parameter 2 for the carrier 2, and configures the channel detection parameter 6 for the carrier 3, the carrier 4 and the carrier 5.

Figure 10:
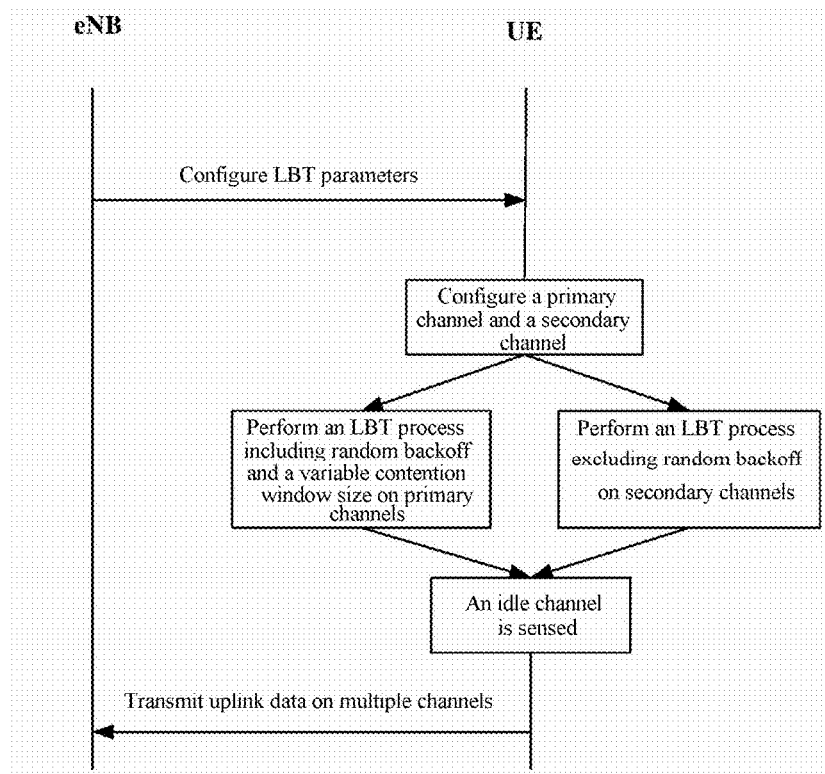
FIG. 10 is a schematic diagram showing signaling interaction in another uplink multi-carrier LBT process according to an embodiment of the present disclosure.

FIG. 10 is a schematic diagram showing signaling interaction in another uplink multi-carrier LBT process according to an embodiment of the present disclosure. As shown in FIG. 10, the eNB configures an LBT parameter for use in a primary channel individually for each of the unauthorized carriers, and configures an LBT parameter for use in a secondary channel uniformly for the unauthorized carriers. Subsequently, the eNB transmits the configured LBT parameter to the UE via RRC signaling and/or medium access control MAC signaling, for example. Subsequently, the UE configures a primary channel and a secondary channel. Subsequently, the UE performs energy detection including random backoff and a variable contention window size on the primary channel, and performs energy detection excluding random backoff on the secondary channel, based on the configured LBT parameter. Subsequently, if the UE senses an available unauthorized carrier, the UE transmits uplink data on the carrier(s).

Figure 11:
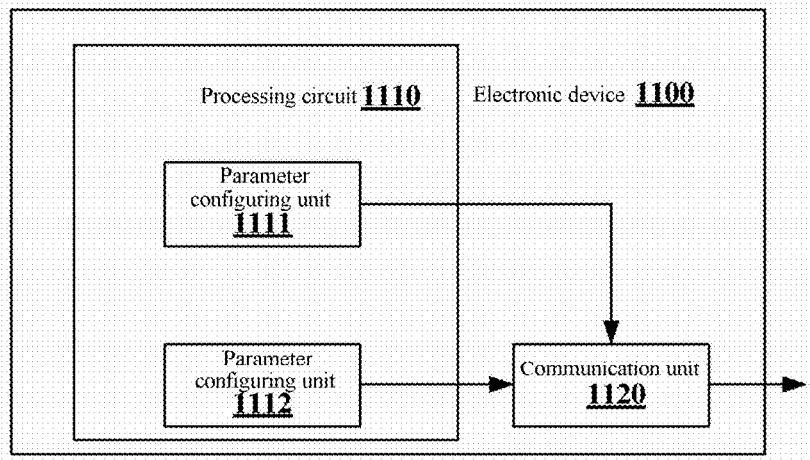
FIG. 11 is a block diagram showing a structure of another electronic device in a wireless communication system according to an embodiment of the present disclosure.

FIG. 11 is a block diagram showing a structure of another electronic device in a wireless communication system according to an embodiment of the present disclosure. The wireless communication system may include multiple unauthorized carriers.

As shown in FIG. 11, the electronic device 1100 may include a processing circuit 1110. It should be noted that, the electronic device 1100 may include one or more processing circuits 1110. In addition, the electronic device 1100 may further include a communication unit 1120 such as a transceiver.

As described above, similarly, the processing circuit 1110 may include various discrete functional units to perform different functions and/or operations. The functional units may be physical entities or logical entities, and units with different names may be implemented by the same physical entity.

For example, as shown in FIG. 11, the processing circuit 1110 may include a parameter configuring unit 1111 and a parameter configuring unit 1112.

The parameter configuring unit 1111 may configure the channel detection parameter for use in the primary channel for each of at least two of multiple unauthorized carriers. Preferably, the parameter configuring unit 1111 may configure the channel detection parameter for use in the primary channel individually for each of at least two of the multiple unauthorized carriers.

The parameter configuring unit 1112 may configure the channel detection parameter for use in the secondary channel for at least one of the multiple unauthorized carriers. Preferably, the parameter configuring unit 1112 may configure the channel detection parameter for use in the secondary channel uniformly for at least one of the multiple unauthorized carriers.

The communication unit 1120 may transmit the channel detection parameter for use in the primary channel and the channel detection parameter for use in the secondary channel to the user equipment, such that the user equipment performs a first channel detection process on each of the primary channels in the multiple unauthorized carriers, to detect whether each of the primary channels is idle; and performs a second channel detection process on each of the secondary channels in the multiple unauthorized carriers, to detect whether each of the secondary channels is idle. The second channel detection process is different from the first channel detection process. Preferably, the electronic device 1100 may transmit the channel detection parameter to the user equipment via radio resource control RRC signaling and/or medium access control MAC signaling.

According to the embodiment of the present disclosure, the wireless communication system may be a licensed assisted access LAA system, and the electronic device 1100 may be a base station.

According to the embodiment of the present disclosure, the first channel detection process is energy detection including random backoff and a variable contention window size.

According to the embodiment of the present disclosure, the second channel detection process is energy detection excluding random backoff.

According to the embodiment of the present disclosure, the processing circuit 1110 is further configured to perform operations of: configuring each of multiple unauthorized carriers as a primary channel or a secondary channel, to obtain at least two primary channels and at least one secondary channels; configuring a channel detection parameter individually for each of the primary channels and configuring a channel detection parameter uniformly for the secondary channels; and transmitting the information on whether each of the multiple unauthorized carriers is a primary channel or a secondary channel to the user equipment by uplink grant information.

According to the embodiment of the present disclosure, the processing circuit 1110 is further configured to perform an operation of: configuring a channel detection parameter for use in the primary channel individually for each of the multiple unauthorized carriers; and configuring a channel detection parameter for use in the secondary channel uniformly for the multiple unauthorized carriers.

Various implementations of the uplink multi-carrier channel detection process performed at the electronic device 1100 side according to the embodiment of the present disclosure have been described in detail in the description of the electronic device 800, which are not repeated here.

Figure 12:
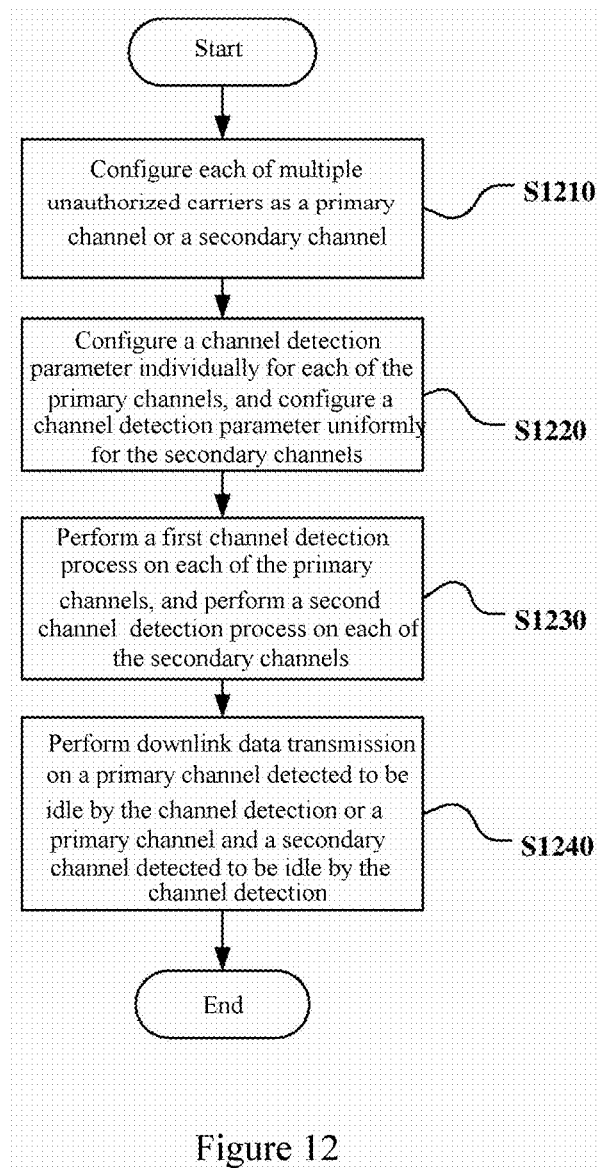
FIG. 12 is a flowchart of a wireless communication method according to an embodiment of the present disclosure.

Subsequently, a method for performing wireless communication in a wireless communication system according to an embodiment of the present disclosure is described with reference to FIG. 12. FIG. 12 shows a flowchart of the wireless communication method according to the embodiment of the present disclosure. The wireless communication system includes multiple unauthorized carriers.

As shown in FIG. 12, firstly, in step S1210, each of multiple unauthorized carriers is configured as a primary channel or a secondary channel, to obtain at least two primary channels and at least one secondary channel.

Subsequently, in step S1220, channel detection parameters are configured for the at least two primary channels and at least one secondary channel.

Subsequently, in step S1230, a first channel detection process is performed on each of the primary channels to detect whether each of the primary channels is idle, and a second channel detection process is performed on each of the secondary channels to detect whether each of the secondary channels is idle. The second channel detection process is different from the first channel detection process.

Subsequently, in step S1240, downlink data transmission is performed on a primary channel detected to be idle by the channel detection or a primary channel and a secondary channel detected to be idle by the channel detection.

Preferably, the first channel detection process is energy detection including random backoff and a variable contention window size.

Preferably, the second channel detection process is energy detection excluding random backoff.

Preferably, when it is detected that a primary channel which is to finish the first channel detection process firstly is idle, each of the secondary channels is triggered to perform the second channel detection process.

Preferably, when it is detected that the primary channel which is to finish the first channel detection process firstly is occupied and a primary channel which is to finish the first channel detection process secondly is idle, each of the secondary channels is triggered to perform the second channel detection process.

Preferably, when it is detected that the primary channel which is to finish the first channel detection process secondly is occupied, a next primary channel which is to finish the first channel detection process is searched for continuously and each of the secondary channels is triggered to perform the second channel detection process, until there is no new primary channel which is to finish the first channel detection and is idle.

Preferably, when it is detected that a primary channel which is to finish the first channel detection process lastly is occupied, no downlink data transmission is performed on the multiple unauthorized carriers.

Preferably, ending time of channel detection processes of the primary channel and the secondary channel is aligned, and the primary channel is aligned with the secondary channel through self-deferral.

Preferably, the wireless communication system is a licensed assisted access (LAA) system, and the method is performed by a base station.

Figure 13:
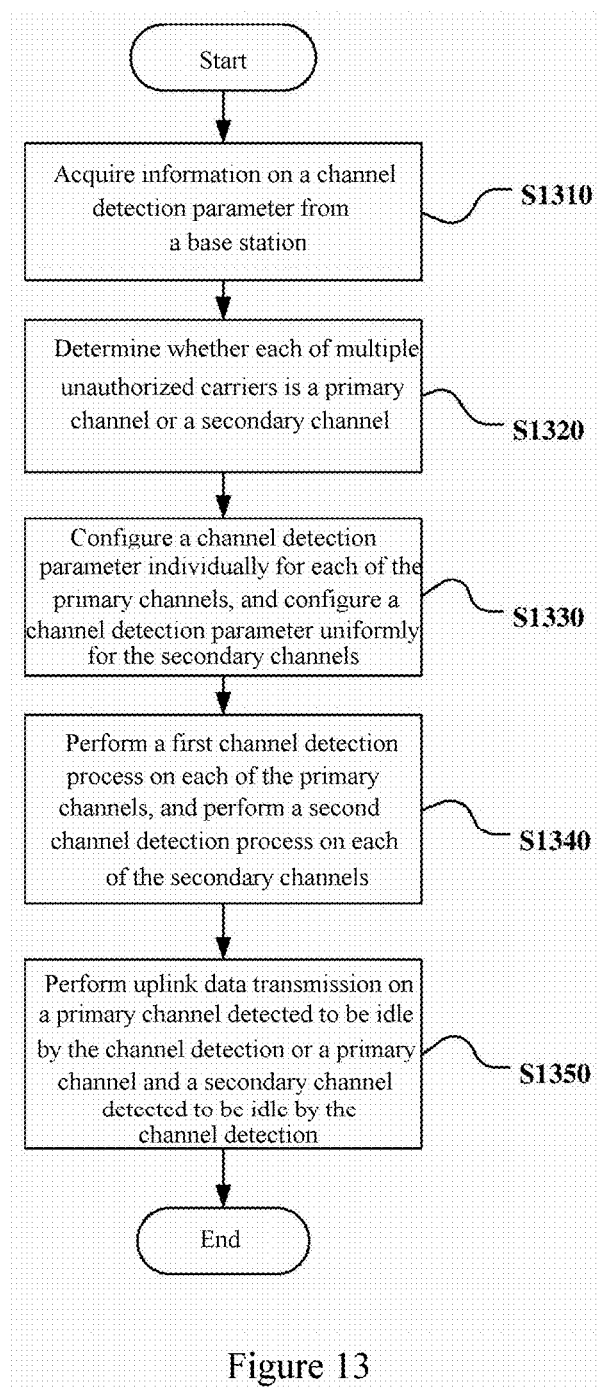
FIG. 13 is a flowchart of a wireless communication method according to another embodiment of the present disclosure.

FIG. 13 is a flowchart of a wireless communication method according to another embodiment of the present disclosure. The wireless communication system includes multiple unauthorized carriers.

As shown in FIG. 13, firstly, in step S1310, information on a channel detection parameter from a base station is acquired.

Subsequently, in step S1320, it is determined whether each of the multiple unauthorized carriers is a primary carrier or a secondary carrier, to obtain at least two primary channels and at least one secondary channel.

Subsequently, in step S1330, based on information on the channel detection parameter, channel detection parameters are configured for at least two primary channels and at least one secondary channel.

Subsequently, in step S1340, a first channel detection process is performed on each of the primary channels to detect whether each of the primary channels is idle, and a second channel detection process is performed on each of the secondary channels to detect whether each of the secondary channels is idle. The second channel detection process is different from the first channel detection process.

Subsequently, in step S1350, uplink data transmission is performed on a primary channel detected to be idle by the channel detection or a primary channel and a secondary channel detected to be idle by the channel detection.

Preferably, the first channel detection process is energy detection including random backoff and a variable contention window size.

Preferably, the second channel detection process is energy detection excluding random backoff.

Preferably, when it is detected that a primary channel which is to finish the first channel detection process firstly is idle, each of the secondary channels is triggered to perform the second channel detection process.

Preferably, when it is detected that the primary channel which is to finish the first channel detection process firstly is occupied and a primary channel which is to finish the first channel detection process secondly is idle, each of the secondary channels is triggered to perform the second channel detection process.

Preferably, when it is detected that the primary channel which is to finish the first channel detection process secondly is occupied, a next primary channel which is to finish the first channel detection process and is idle is searched for continuously, each of the secondary channels is triggered to perform the second channel detection process, until there is no new primary channel which is to finish the first channel detection process and is idle.

Preferably, when it is detected that a primary channel which is to finish the first channel detection process lastly is occupied, no uplink data transmission is performed on the multiple unauthorized carriers.

Preferably, ending time of channel detection processes of the primary channel and the secondary channel is aligned, and the primary channel is aligned with the secondary channel through self-deferral.

Preferably, the method may further include: acquiring uplink grant information from a base station, where the uplink grant information includes information on whether each of multiple unauthorized carriers is a primary channel or a secondary channel; and determining whether each of the multiple unauthorized carriers is a primary channel or a secondary channel based on the information on whether each of the multiple unauthorized carriers is a primary channel or a secondary channel.

Preferably, the method may further include: pre-estimating power consumption information of the first channel detection process and the second channel detection process and power status information of a user equipment; and determining whether each of the multiple unauthorized carriers is a primary channel or a secondary channel, based on the pre-estimated power consumption information and power status information.

Preferably, the wireless communication system is a licensed assisted access (LAA) system, and the method is performed by a user equipment.

Figure 14:
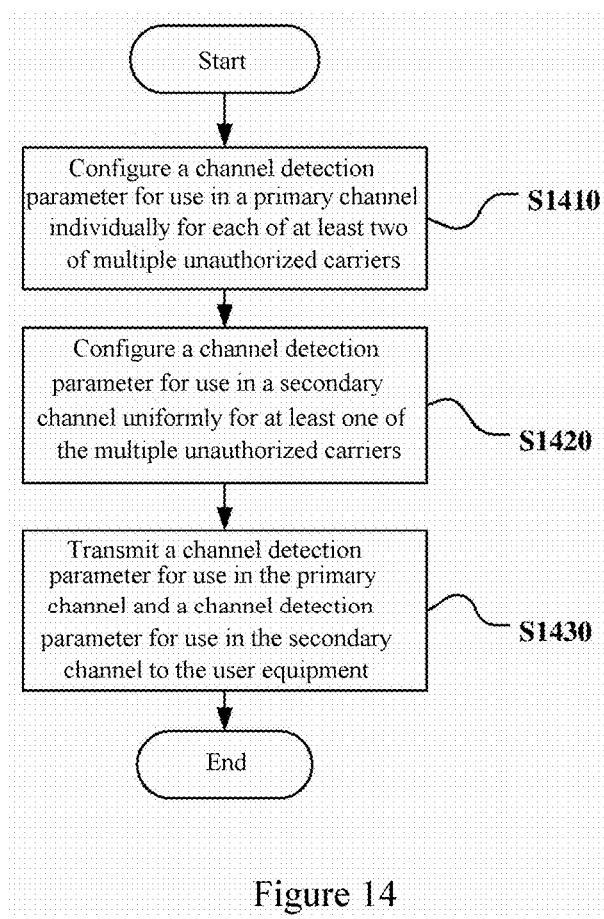
FIG. 14 is a flowchart of a wireless communication method according to another embodiment of the present disclosure.

FIG. 14 is a flowchart of a wireless communication method according to another embodiment of the present disclosure. The wireless communication system includes multiple unauthorized carriers.

As shown in FIG. 14, firstly, in step S1410, a channel detection parameter for use in a primary channel is configured for each of at least two of multiple unauthorized carriers.

Subsequently, in step S1420, a channel detection parameter for use in a secondary channel is configured for at least one of the multiple unauthorized carriers.

Subsequently, in step S1430, the channel detection parameter for use in the primary channel and the channel detection parameter for use in the secondary channel are transmitted to the user equipment, such that the user equipment performs the first channel detection process on each of the primary channels in the multiple unauthorized carriers to detect whether each of the primary channels is idle, and performs a second channel detection process on each of the secondary channels in the multiple unauthorized carriers, to detect whether each of the secondary channels is idle. The second channel detection process is different from the first channel detection process.

Preferably, the first channel detection process is energy detection including random backoff and a variable contention window size.

Preferably, the second channel detection process is energy detection excluding random backoff.

Preferably, the method further includes: configuring each of the multiple unauthorized carriers as a primary channel or a secondary channel, to obtain at least two primary channels and at least one secondary channel; configuring a channel detection parameter individually for each of the primary channels and configuring a channel detection parameter uniformly for the secondary channel; and transmitting the information on whether each of the multiple unauthorized carriers is a primary channel or a secondary channel to the user equipment by uplink grant information.

Preferably, the method further includes: configuring a channel detection parameter for use in the primary channel individually for each of the multiple unauthorized carriers;

and configuring a channel detection parameter for use in the secondary channel uniformly for the multiple unauthorized carriers.

Preferably, the wireless communication system is a licensed assisted access (LAA) system, and the method is performed by a base station.

Various implementations of steps in the method for performing wireless communication in the wireless communication system according to the embodiment of the present disclosure have been described in detail above, which are not repeated here.

The technology according to the present disclosure may be applied to various types of products. For example, the base station mentioned in the present disclosure may be implemented as any type of evolution Node B (eNB), such as a macro eNB and a small eNB. The small eNB may be an eNB of a cell with a coverage less than that of a macro cell, such as a pico-eNB, a micro-eNB and a household (femto) eNB. Alternatively, the base station may be implemented as any other types of base stations, such as a NodeB and a base transceiver station (BTS). The base station may include: a body configured to control wireless communication (also referred to as a base station device); and one or more remote radio head-ends (RRHs) arranged at different places from the body. In addition, various types of terminals described in the following may function as a base station to operate by performing functions of the base station temporarily or in a semi-persistent manner.

For example, the UE mentioned in the present disclosure may be implemented as a mobile terminal (such as a smart phone, a tablet personal computer (PC), a notebook PC, a portable game terminal and a portable/dongle mobile router and a digital camera) or a vehicle-mounted terminal (such as an automobile navigation device). The UE may be further implemented as a terminal performing machine to machine (M2M) communication (also referred to as a MTC terminal). In addition, the UE may be a wireless communication module installed on each of the above terminals (such as an integrated circuit module including a single wafer).

Figure 15:
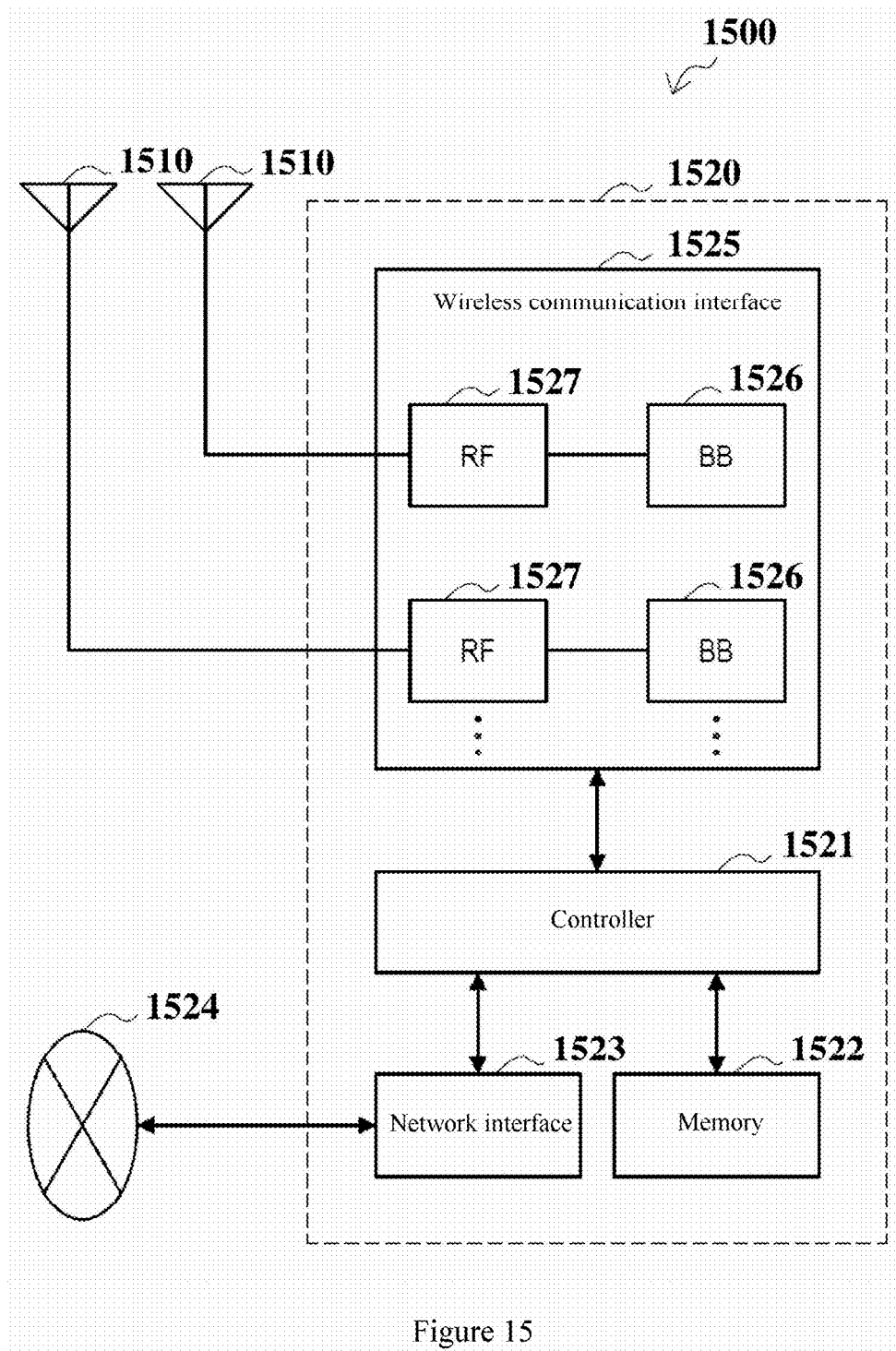
FIG. 15 is a block diagram showing a first example of a schematic configuration of an evolution Node Base Station (eNB) adapting to the present disclosure.

FIG. 15 is a block diagram showing a first example of a schematic configuration of an eNB to which the technology of the present disclosure may be applied. An eNB 1500 includes one or more antennas 1510 and a base station device 1520. The base station device 1520 and each antenna 1510 may be connected to each other via an RF cable.

Each of the antennas 1510 includes a single or multiple antenna elements (such as multiple antenna elements included in a multiple-input multiple-output (MIMO) antenna) and is used for the base station device 1520 to transmit and receive a wireless signal. As shown in FIG. 15, the eNB 1000 may include multiple antennas 1510. For example, the multiple antennas 1510 may be compatible with multiple frequency bands used by the eNB 1500. Although FIG. 15 shows an example in which the eNB 1500 includes multiple antennas 1510, the eNB 1500 may include a single antenna 1510.

The base station device 1520 includes a controller 1521, a memory 1522, a network interface 1523 and a wireless communication interface 1525.

The controller 1521 may be a CPU or DSP for example and controls various types of functions of higher layers of the base station device 1520. For example, the controller 1521 generates a data packet according to data in a signal processed by the wireless communication interface 1525, and transfers the generated packet via the network interface 1523. The controller 1521 may bundle data from multiple baseband processors to generate a bundle packet and transfers the generated bundle packet. The controller 1521 may have logic functions to perform the following control: such as wireless resource control, wireless bearer control, mobility management, admission control and schedule. The control may be implemented in conjunction with an eNB or a core network node nearby. The memory 1522 includes an RAM and an ROM and stores programs performed by the controller 1521 and various types of control data (such as a terminal list, transmission power data and schedule data).

The network interface 1523 is a communication interface connecting a base station device 1520 to a core network 1524. The controller 1521 may communicate with a core network node or another eNB via the network interface 1523. In this case, the eNB 1500 may be connected to the core network node or other eNB via a logic interface (such as an S1 interface and an X2 interface). The network interface 1523 may also be a wired communication interface or a wireless communication interface for a wireless backhaul line. If the network interface 1523 is a wireless communication interface, the network interface 1523 may use a higher frequency band for wireless communication as compared with a frequency band used by the wireless communication interface 1525.

The wireless communication interface 1525 supports any cellular communication scheme (such as Long Term Evolution (LTE) and LTE-advanced), and provide wireless connection to a terminal in a cell of the eNB 1500 via an antenna 1510. The wireless communication interface 1525 may generally include a baseband (BB) processor 1526 and an RF circuit 1527. The BB processor 1526 may perform for example encoding/decoding, modulating/demodulating and multiplexing and de-multiplexing and perform various types of signal processing of layers (such as L1, medium access control (MAC), radio link control (RLC) and packet data convergence protocol (PDCP). Instead of a controller 1521, the BB processor 1526 may have a part or all of the logic functions described above. The BB processor 1526 may be a memory storing communication control programs, or a module including a processor configured to perform programs and related circuits. Updating programs may change functions of the BB processor 1526. The module may be a card or a blade inserted to a slot of the base station device 1520. Alternatively, the module may also be a chip installed on the card or the blade. Meanwhile, an RF circuit 1527 may include for example a mixer, a filter and an amplifier, and transmits and receives a wireless signal via the antenna 1510.

As shown in FIG. 15, the wireless communication interface 1525 may include multiple BB processors 1526. For example, the multiple BB processors 1526 may be compatible with multiple frequency bands used by the eNB 1500. As shown in FIG. 15, the wireless communication interface 1525 may include multiple RF circuits 1527. For example, the multiple RF circuits 1527 may be compatible with multiple antenna elements. Although FIG. 15 shows an example in which the wireless communication interface 1525 includes multiple BB processors 1526 and multiple RF circuits 1527, the wireless communication interface 1525 may include a single BB processor 1526 or a single RF circuit 1527.

Figure 16:
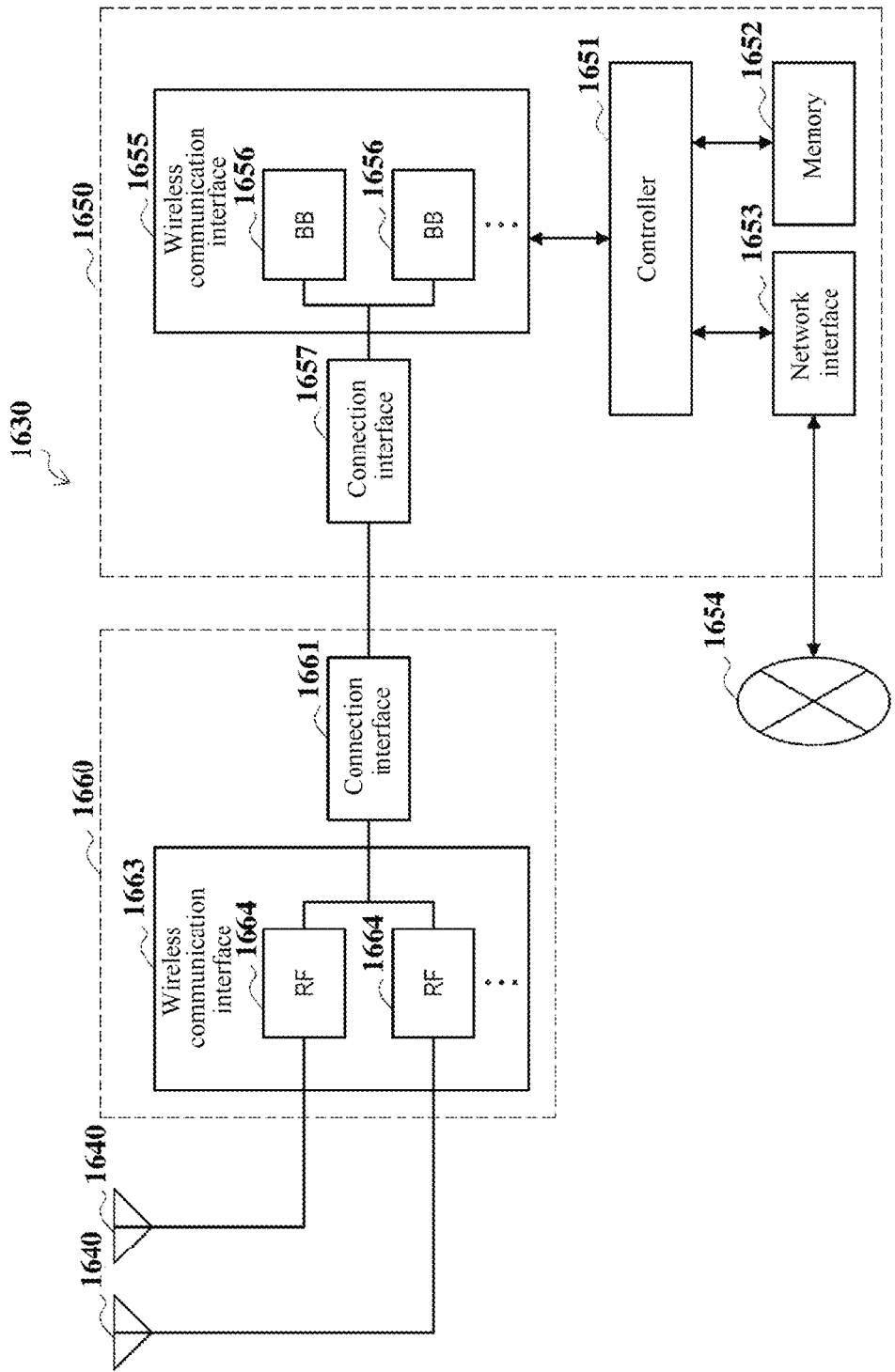
FIG. 16 is a block diagram showing a second example of the schematic configuration of the eNB adapting to the present disclosure.

FIG. 16 is a block diagram showing a second example of the schematic configuration of the eNB to which the technology of the present disclosure may be applied. An eNB 1630 includes one or more antennas 1640, a base station device 1650 and an RRH 1660. The RRH 1660 and each antenna 1640 may be connected to each other via an RF cable. The base station device 1650 and the RRH 1660 may be connected to each other via a high speed line such as an optical fiber cable.

Each of the antennas 1640 includes a single or multiple antenna elements (such as multiple antenna elements included in the MIMO antenna) and is used for the RRH 1660 to transmit and receive a wireless signal. As shown in FIG. 16, the eNB 1630 may include multiple antennas 1640. For example, the multiple antennas 1640 may be compatible with multiple frequency bands used by the eNB 1630. Although FIG. 16 shows an example in which the eNB 1630 includes multiple antennas 1640, the eNB 1630 may include a single antenna 1640.

The base station device 1650 includes a controller 1651, a memory 1652, a network interface 1653, a wireless communication interface 1655 and a connection interface 1657. The controller 1651, the memory 1652 and the network interface 1653 are the same as the controller 1521, the memory 1522 and the network interface 1523 described with reference to FIG. 15.

A wireless communication interface 1655 supports any cellular communication scheme (such as LTE and LTE-advanced), and provide wireless communication with a terminal in a sector corresponding to the RRH 1660 via the RRH 1660 and the antenna 1640. The wireless communication interface 1655 may generally include a BB processor 1656 for example. In addition to that the BB processor 1656 is connected to an RF circuit 1664 of the RRH 1660 via the connection interface 1657, the BB processor 1656 is the same as the BB processor 1526 described with reference to FIG. 15. As shown in FIG. 16, the wireless communication interface 1655 may include multiple BB processors 1656. For example, the multiple BB processors 1656 may be compatible with multiple frequency bands used by the eNB 1630. Although FIG. 16 shows an example in which the wireless communication interface 1655 includes multiple BB processors 1656, the wireless communication interface 1655 may include a single BB processor 1656.

The connection interface 1657 is an interface configured to connect the base station device 1650 (the wireless communication interface 1655) to the RRH 1660. The connection interface 1657 may be a communication module for communication in the high speed line described above which connects the base station device 1650 (the wireless communication interface 1655) to the RRH 1660.

The RRH 1660 includes a connection interface 1661 and a wireless communication interface 1663.

The connection interface 1661 is an interface configured to connect the RRH 1660 (the wireless communication interface 1163) to the base station device 1650. The connection interface 1661 may be a communication module for performing communication via the high speed line described above.

The wireless communication interface 1663 transmits and receives a wireless signal via the antenna 1640. The wireless communication interface 1663 may generally include an RF circuit 1664 for example. The RF circuit 1664 may include for example a mixer, a filter and an amplifier, and transmits and receives a wireless signal via the antenna 1640. As shown in FIG. 16, the wireless communication interface 1663 may include multiple RF circuits 1664. For example, the multiple RF circuits 1664 may support multiple antenna elements. Although FIG. 16 shows an example in which the wireless communication interface 1663 includes multiple RF circuits 1664, the wireless communication interface 1663 may include a single RF circuit 1664.

In the eNB 1500 and the eNB 1630 shown in FIG. 15 and FIG. 16, the processing circuit 210 described with reference to FIG. 1 and the channel configuring unit 211, the parameter configuring unit 212 and the channel detection unit 213 in the processing circuit 210, and the processing circuit 1110 described with reference to FIG. 11 and the parameter configuring unit 1111 and the parameter configuring unit 1112 in the processing circuit 1110 may be implemented by the controller 1521 and/or the controller 1651. The communication unit 220 described with reference to FIG. 1 and the communication unit 1120 described with reference to FIG. 11 may be implemented by the wireless communication interface 1525 and the wireless communication interface 1655 and/or the wireless communication interface 1663. At least a part of the functions may be implemented by the controller 1521 and the controller 1651. For example, the controller 1521 and/or the controller 1651 may perform the functions of channel configuring, channel detection parameter configuring and channel detection by executing instructions stored in the corresponding memory.

Figure 17:
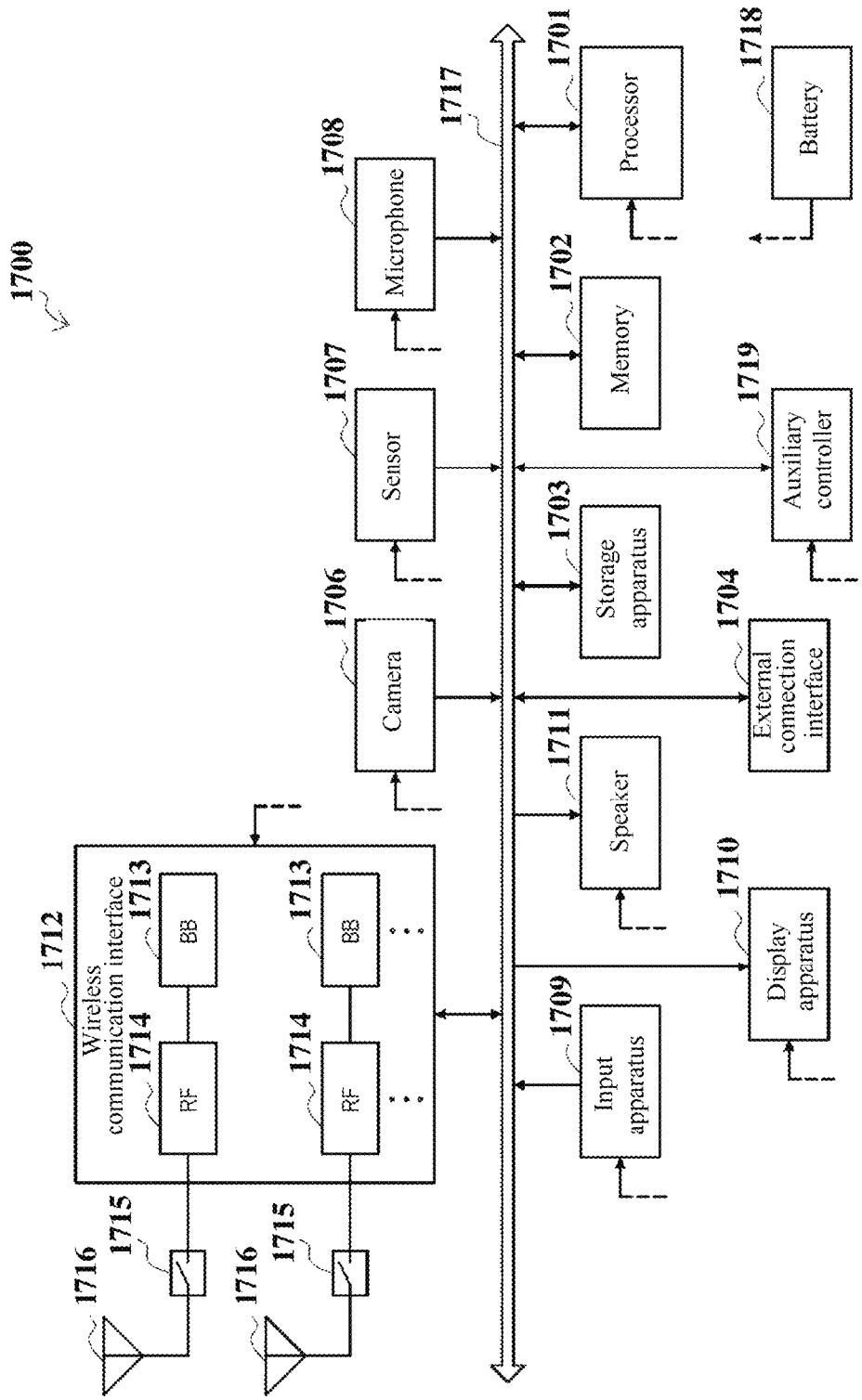
FIG. 17 is a block diagram showing an example of a schematic configuration of a smartphone adapting to the present disclosure.

FIG. 17 is a block diagram showing an example of a schematic configuration of a smart phone 1700 to which the technology of the present disclosure may be applied. The smart phone 1700 includes: a processor 1701, a memory 1702, a storage apparatus 1703, an external connection interface 1704, a camera 1706, a sensor 1707, a microphone 1708, an input apparatus 1709, a display apparatus 1710, a loudspeaker 1711, a wireless communication interface 1712, one or more antenna switches 1715, one or more antennas 1716, a bus 1717, a battery 1718 and an auxiliary controller 1719.

The processor 1701 may be for example a CPU or a system on chip (SoC), and control functions of an application layer and other layers of the smart phone 1700. The memory 1702 includes an RAM and an ROM, and stores programs executed by the processor 1701 and data. The storage apparatus 1703 may include a storage medium, such as a semiconductor memory and a hard disk. The external connection interface 1704 is an interface configured to connect an external apparatus (such as a memory card and a universal serial bus (USB) device) to the smart phone 1700.

The camera 1706 includes an image sensor (such as a charge coupled device (CCD) and a complementary metal oxide semiconductor (CMOS)) and generates a captured image. The sensor 1707 may include a set of sensors, such as a measurement sensor, a gyroscope sensor, a geomagnetic sensor and an acceleration sensor. The microphone 1708 converts sound inputted into the smart phone 1700 into an audio signal. The input apparatus 1709 includes for example a touch sensor configured to detect touch on a screen of the display apparatus 1710, a keypad, a keyboard, a button or a switch, and receives an operation or information inputted from a user. The display apparatus 1710 includes a screen (such as a liquid crystal display (LCD) and an organic light emitting diode (OLED) display), and displays an output image of the smart phone 1700. The loudspeaker 1711 converts the audio signal outputted from the smart phone 1700 into sound.

The wireless communication interface 1712 supports any cellular communication scheme (such as LTE and LTE-advanced), and performs wireless communication. The wireless communication interface 1712 may generally include for example a BB processor 1713 and an RF circuit 1714. The BB processor 1713 may perform encoding/decoding, modulating/demodulating and multiplexing/de-multiplexing for example, and perform various types of signal processing for wireless communication. Meanwhile, the RF circuit 1714 may include for example a mixer, a filter and an amplifier, and transmits and receives a wireless signal via an antenna 1716. The wireless communication interface 1712 may be a chip module on which a BB processor 1713 and the RF circuit 1714 are integrated. As shown in FIG. 17, the wireless communication interface 1712 may include multiple BB processors 1713 and multiple RF circuits 1714. Although FIG. 17 shows an example in which the wireless communication interface 1712 includes multiple BB processors 1713 and multiple RF circuits 1714, the wireless communication interface 1712 may include a single BB processor 1713 or a single RF circuit 1714.

In addition to the cellular communication scheme, the wireless communication interface 1712 may support other types of wireless communication schemes, such as a short distance wireless communication scheme, a near field communication scheme and a wireless local area network (LAN) scheme. In this case, the wireless communication interface 1712 may include a BB processor 1713 and an RF circuit 1714 for each type of wireless communication scheme.

Each of the wireless switches 1715 switches a connection destination of the antenna 1716 between multiple circuits (for example circuits for different wireless communication schemes) included in the wireless communication interface 1712.

Each of the antennas 1716 includes a single or multiple antenna elements (such as multiple antenna elements included in the MIMO antenna), and is used for the wireless communication interface 1712 to transmit and receive a wireless signal. As shown in FIG. 17, the smart phone 1700 may include multiple antennas 1716. Although FIG. 17 shows an example in which the smart phone 1700 includes multiple antennas 1716, the smart phone 1700 may include a single antenna 1716.

In addition, the smart phone 1700 may include an antenna 1716 for each type of wireless communication scheme. In this case, the antenna switch 1715 may be omitted from the configuration of the smart phone 1700.

The bus 1717 connects the processor 1701, the memory 1702, the storage apparatus 1703, the external connection interface 1704, the camera 1706, the sensor 1707, the microphone 1708, the input apparatus 1709, the display apparatus 1710, the loudspeaker 1711, the wireless communication interface 1712 and the auxiliary controller 1719 with each other. The battery 1718 supplies power for blocks in the smart phone 1700 shown in FIG. 17 via a feeder which is indicated partially as a dashed line in the figure. The auxiliary controller 1719 controls a minimum necessary function of the smart phone 1700 in a sleeping mode, for example.

In the smart phone 1700 shown in FIG. 17, the processing circuit 810 described with reference to FIG. 8 and the acquiring unit 811, the channel configuring unit 812, the parameter configuring unit 813 and the channel detection unit 814 in the processing circuit 810 may be implemented by the processor 1701 or the auxiliary controller 1719, and the communication unit 820 described with reference to FIG. 8 may be implemented by the wireless communication interface 1712. At least a part of the functions may be implemented by the processor 1701 or the auxiliary controller 1719. For example, the processor 1701 or the auxiliary controller 1719 may acquire the channel detection parameter, determine the primary channel and the secondary channel and configure the channel detection parameter and cause the communication unit 820 to perform uplink data transmission by executing instructions stored in the memory 1702 or the storage apparatus 1703.

Figure 18:
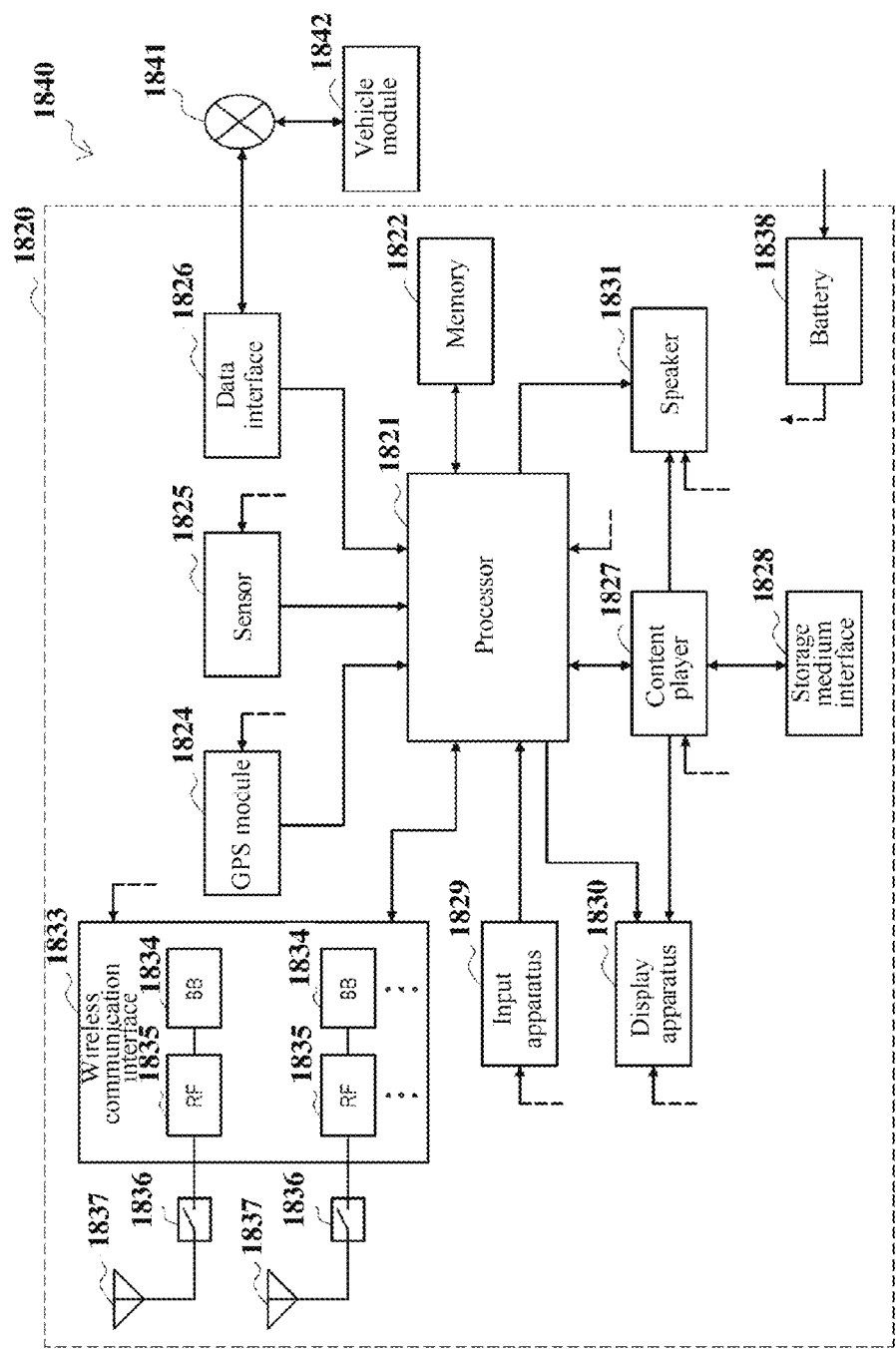
FIG. 18 is a block diagram showing an example of a schematic configuration of an automobile navigation device adapting to the present disclosure.

FIG. 18 is a block diagram showing an example of a schematic configuration of an automobile navigation device 1820 to which the technology of the present disclosure may be applied. The automobile navigation device 1820 includes a processor 1821, a memory 1822, a global positioning system (GPS) module 1824, a sensor 1825, a data interface 1826, a content player 1827, a storage medium interface 1828, an input apparatus 1829, a display apparatus 1830, a loudspeaker 1831, a wireless communication interface 1833, one or more antenna switches 1836, one or more antennas 1837 and a battery 1838.

The processor 1821 may be a CPU or an SoC, and controls a navigation function and other functions of the automobile navigation device 1820. The memory 1822 includes an RAM and an ROM, and stores programs executed by the processor 1821 and data.

The GPS module 1824 measures a position of the automobile navigation device 1820 (such as a latitude, a longitude and a height) by using a GPS signal received from a GPS satellite. The sensor 1825 may include a set of sensors, such as a gyroscope sensor, a geomagnetic sensor and an air pressure sensor. The data interface 1826 is connected to a vehicle network 1841 for example through a terminal not shown, and acquires data generated by the vehicle (such as vehicle speed data).

The content player 1827 reproduces contents stored in a storage medium (such as a CD and a DVD), and the storage medium is inserted into the storage medium interface 1828. The input apparatus 1829 includes for example a touch sensor configured to detect touch on a screen of the display apparatus 1530, a button or a switch, and receives an operation or information inputted from a user. The display apparatus 1830 includes a screen of an LCD or OLED display for example, and displays an image with a navigation function or the reproduced content. The loudspeaker 1831 outputs a sound with a navigation function or the reproduced content.

The wireless communication interface 1833 supports any cellular communication scheme (such as LTE and LTE-advanced), and performs wireless communication. The wireless communication interface 1833 may generally include a BB processor 1834 and an RF circuit 1835 for example. The BB processor 1834 may perform encoding/decoding, modulating/demodulating and multiplexing/de-multiplexing, and perform various types of signal processing for wireless communication. Meanwhile, the RF circuit 1835 may include for example a mixer, a filter and an amplifier, and transmits and receives a wireless signal via the antenna 1837. The wireless communication interface 1833 may also be a chip module on which the BB processor 1834 and the RF circuit 1835 are integrated. As shown in FIG. 18, the wireless communication interface 1833 may include multiple BB processors 1834 and multiple RF circuits 1835. Although FIG. 18 shows an example in which the wireless communication interface 1833 includes multiple BB processors 1834 and multiple RF circuits 1835, the wireless communication interface 1833 may include a single BB processor 1834 or a single RF circuit 1835.

In addition to the cellular communication scheme, the wireless communication interface 1833 may support other types of wireless communication schemes, such as a short distance wireless communication scheme, a near field communication scheme and a wireless LAN scheme. In this case, for each type of wireless communication scheme, the wireless communication interface 1833 may include the BB processor 1834 and the RF circuit 1835.

Each of the antenna switches 1836 switches a connection destination of the antenna 1837 between multiple circuits (such as circuits for different wireless communication schemes) included in the wireless communication interface 1833.

Each of the antennas 1837 includes a single or multiple antenna elements (such as multiple antenna elements included in the MIMO antenna), and is used for the wireless communication interface 1833 to transmit and receive a wireless signal. As shown in FIG. 18, the automobile navigation device 1820 may include multiple antennas 1837. Although FIG. 18 shows an example in which the automobile navigation device 1820 includes multiple antennas 1837, the automobile navigation device 1820 may include a single antenna 1837.

In addition, the automobile navigation device 1820 may include the antenna 1837 for each type of wireless communication scheme. In this case, the antenna switch 1836 may be omitted from the configuration of the automobile navigation device 1820.

The battery 1838 supplies power for blocks in the automobile navigation device 1820 shown in FIG. 18 via a feeder which is indicated partially as a dashed line in the figure. The battery 1838 accumulates power provided by the vehicle.

In the automobile navigation device 1820 shown in FIG. 18, the processing circuit 810 described with reference to FIG. 8 and the acquiring unit 811, the channel configuring unit 812, the parameter configuring unit 813 and the channel detection unit 814 in the processing circuit 810 may be implemented by the processor 1821, and the communication unit 820 described with reference to FIG. 8 may be implemented by the wireless communication interface 1833. At least a part of the functions may be implemented by the processor 1821. For example, the processor 1821 may acquire the channel detection parameter, determine the primary channel and the secondary channel, configure the channel detection parameter and cause the communication unit 820 to perform uplink data transmission by executing instructions stored in the memory 1822.

The technology of the present disclosure may be implemented as a vehicle-mounted system (or a vehicle) 1840 including one or more of the automobile navigation device 1820, the vehicle network 1841 and a vehicle module 1842. The vehicle module 1842 generates vehicle data (such as a vehicle speed, an engine speed and fault information), and outputs the generated data to the vehicle network 1841.

In the system and method according to the present disclosure, obviously, components or steps may be decomposed and/or recombined. The decomposition and/or recombination should be regarded as equivalent solutions of the present disclosure. In addition, steps in the series of processing described above may be performed naturally in an order of description and in a time order, and is not necessarily performed in the time order. Some steps may be performed in parallel or independently from each other.

Although the embodiments of the present disclosure are described in detail in conjunction with the drawings above, it should be understood that the embodiments described above are only used to illustrate the present disclosure and are not intended to limit the present disclosure. For those skilled in the art, various types of changes and modifications may be made to the embodiments without departing from the essence and scope of the present disclosure. Therefore, the scope of the present disclosure is defined by only the appended claims and equivalent meaning thereof

The invention claimed is:

1. An electronic device in a wireless communication system, the wireless communication system comprising a plurality of unlicensed carriers, and the electronic device comprising:

one or more processing circuits configured to perform operations of:

acquiring information on channel detection parameters from a base station;

based on the acquired information, configuring the channel detection parameters for an uplink transmission on a plurality of first unlicensed carriers of the plurality of unlicensed carriers and a plurality of second unlicensed carriers of the plurality of unlicensed carriers;

based on the configured channel detection parameters, performing a first channel access process on the plurality of first unlicensed carriers and a second channel access process on the plurality of second unlicensed carriers, wherein, based on the configured channel detection parameters:

the first channel access process comprises a first channel energy detection process that includes a random backoff, a variable contention window size and a self-deferral period, the first channel energy detection being individually configured for each of the plurality of first channels, and the second channel access process is a second channel energy detection process that excludes random backoff and that is uniformly configured for each of the plurality of second channels, and wherein ending times of the first and second channel access processes are aligned, with each of the plurality of first unlicensed carriers being aligned with the plurality of second unlicensed carriers based on the corresponding self-deferral periods of the plurality of first unlicensed carriers;

based on the first channel access process, detecting that a first unlicensed carrier of the plurality of first unlicensed carriers which has finished the first channel access process firstly is initially idle;

based on the first unlicensed carrier of the plurality of first unlicensed carriers which has finished the first channel access process firstly being initially idle, starting the second channel access process on the plurality of second unlicensed carriers while continuing to perform the first channel access process on the plurality of first unlicensed carriers;

subsequently detecting that the first unlicensed carrier of the plurality of first unlicensed carriers which has finished the first channel access process firstly is no longer idle but is occupied, and stopping the second channel access process while continuing to perform the first channel access process on the plurality of first unlicensed carriers;

after stopping the second channel access process, detecting that a first unlicensed carrier of the plurality of first unlicensed carriers which has finished the first channel access process secondly is idle;

based on detecting that the first of the plurality of first unlicensed carriers which has finished the first channel access process secondly is idle, triggering the second channel access process to restart while continuing to perform the first channel access process on the plurality of first unlicensed carriers; and at a predetermined time, upon determining that the first of the plurality of first unlicensed carriers which has finished the first channel access process secondly remains idle, performing an uplink data transmission on:
- the first of the plurality of first unlicensed carriers which has finished the first channel access process secondly, and
- any of the plurality of second unlicensed carriers which are detected to be idle by the restarted second channel access process.

2. The electronic device of claim 1, wherein the uplink data transmission is also performed on any other of the plurality of first unlicensed carriers which are determined to be idle at the predetermined time.

3. A method, implemented in circuitry of an electronic device, for performing wireless communication in a wireless communication system, the wireless communication system comprising a plurality of unlicensed carriers, and the method comprising:
- acquiring information on channel detection parameters from a base station;
- based on the acquired information, configuring the channel detection parameters for an uplink transmission on a plurality of first unlicensed carriers of the plurality of unlicensed carriers and a plurality of second unlicensed carriers of the plurality of unlicensed carriers;
- based on the configured channel detection parameters, performing a first channel access process on the plurality of first unlicensed carriers and a second channel access process on the plurality of second unlicensed carriers,
- wherein, based on the configured channel detection parameters:
  - the first channel access system comprises a first channel energy detection process that includes a random backoff, a variable contention window size and a self-deferral period, the first channel energy detection being individually configured for each of the plurality of first channels, and
  - the second channel access process is a second channel energy detection process that excludes random backoff and that is uniformly configured for each of the plurality of second channels, and
- wherein ending times of the first and second channel access processes are aligned, with each of the plurality of first unlicensed carriers being aligned with the plurality of second unlicensed carriers based on the corresponding self-deferral periods of the plurality of first unlicensed carriers;
- based on the first channel access process, detecting that a first unlicensed carrier of the plurality of first unlicensed carriers which has finished the first channel access process firstly is initially idle;
- based on the first unlicensed carrier of the plurality of first unlicensed carriers which has finished the first channel access process firstly being initially idle, starting the second channel access process on the plurality of second unlicensed carriers while continuing to perform the first channel access process on the plurality of first unlicensed carriers;
- subsequently detecting that the first unlicensed carrier of the plurality of first unlicensed carriers which has finished the first channel access process firstly is no longer idle but is occupied, and stopping the second channel access process while continuing to perform the first channel access process on the plurality of first unlicensed carriers;
- after stopping the second channel access process, detecting that a first unlicensed carrier of the plurality of first unlicensed carriers which has finished the first channel access process secondly is idle;
- based on detecting that the first of the plurality of first unlicensed carriers which has finished the first channel access process secondly is idle, triggering the second channel access process to restart while continuing to perform the first channel access process on the plurality of first unlicensed carriers; and
- at a predetermined time, upon determining that the first of the plurality of first unlicensed carriers which has finished the first channel access process secondly remains idle, performing an uplink data transmission on:
  - the first of the plurality of first unlicensed carriers which has finished the first channel access process secondly, and
  - any of the plurality of second unlicensed carriers which are detected to be idle by the restarted second channel access process.

4. The method of claim 3, wherein the uplink data transmission is also performed on any other of the plurality of first unlicensed carriers which are determined to be idle at the predetermined time.

\* \* \* \* \*